(12) United States Patent
Piesinger

(10) Patent No.: US 11,472,537 B2
(45) Date of Patent: Oct. 18, 2022

(54) ARTIFICIAL BUOYANCY METHOD AND APPARATUS

(71) Applicant: Gregory Hubert Piesinger, Cave Creek, AZ (US)

(72) Inventor: Gregory Hubert Piesinger, Cave Creek, AZ (US)

(*) Notice: Subject to any disclaimer, the term of this patent is extended or adjusted under 35 U.S.C. 154(b) by 0 days.

(21) Appl. No.: 17/395,767

(22) Filed: Aug. 6, 2021

(65) Prior Publication Data

US 2022/0177116 A1 Jun. 9, 2022

Related U.S. Application Data

(60) Provisional application No. 63/122,015, filed on Dec. 7, 2020.

(51) Int. Cl.
*B64C 23/00* (2006.01)
*B64C 23/02* (2006.01)
*B64D 47/06* (2006.01)

(52) U.S. Cl.
CPC ............ *B64C 23/005* (2013.01); *B64C 23/02* (2013.01); *B64D 47/06* (2013.01)

(58) Field of Classification Search
CPC ....... B64C 23/005; B64C 23/04; B64C 23/02; B64C 13/04; B64D 47/06
See application file for complete search history.

(56) References Cited

U.S. PATENT DOCUMENTS 6,543,719 B1 * 4/2003 Hassan ................... B64C 23/04
244/76 R 7,967,258 B2 * 6/2011 Smith ....................... F15D 1/12
244/130

(Continued)

FOREIGN PATENT DOCUMENTS

WO WO-2017216139 A1 * 12/2017 ........... A61B 8/4483

OTHER PUBLICATIONS

Bo ma et al., "Wide Bandwidth and Low Driving Voltage Vented CMUTs for Airborne Applications" (Year: 2019).*

(Continued)

*Primary Examiner* — Assres H Woldemaryam

(57) ABSTRACT

Lifting devices are described that provide aeronautical lift by either pushing air sideways off its top surface, or by pulling away from top surface air, without changing upward air pressure on its bottom surface. In a first implementation, a pyramid shaped structure is composed of a stack of thin sections whose dimensions are rapidly extended and retracted using ultrasonic movements. Top surface air is pushed sideways when extended followed by momentary low pressure when retracted, thus providing lift. In a second implementation, a rapidly rotating lifting device is composed of a stack of thin round teethed plates, resembling circular saw blades, in which the diameter of each upper plate is slightly smaller than each lower plate. This device also creates lift as teeth push air sideways and gaps between teeth create momentary low pressure. In a third implementation, a lifting device top surface contains an array of MicroElectroMechanical Systems (MEMS) devices, such as Capacitive Micromachined Ultrasonic Transducers (CMUTs), which momentary produce lift by their upper pointing membranes rapidly pulling away from lifting device top surface air when oscillating at high frequency.

7 Claims, 19 Drawing Sheets

(56) References Cited

U.S. PATENT DOCUMENTS

| | | | | |
|---|---|---|---|---|
| 8,796,901 B2* | 8/2014 | Huang | ............... | H02N 1/006 |
| | | | | 367/181 |
| 8,967,965 B1* | 3/2015 | Colasante | ............ | G10K 9/122 |
| | | | | 294/185 |
| 9,834,301 B1* | 12/2017 | Patel | ................. | F42B 10/668 |
| 10,427,188 B2* | 10/2019 | Oralkan | ............... | B81C 3/001 |
| 11,299,260 B2* | 4/2022 | Wine | .................. | B64C 23/02 |
| 2007/0228878 A1* | 10/2007 | Huang | ............. | G01N 29/2406 |
| | | | | 310/322 |
| 2009/0140609 A1* | 6/2009 | Huang | ............... | B06B 1/0292 |
| | | | | 310/334 |
| 2010/0071773 A1* | 3/2010 | Whalen | .............. | B64C 21/025 |
| | | | | 137/2 |
| 2012/0250454 A1* | 10/2012 | Rohling | .............. | G10K 11/35 |
| | | | | 367/137 |
| 2016/0023244 A1* | 1/2016 | Zhuang | .............. | B81B 3/0037 |
| | | | | 29/829 |
| 2016/0075548 A1* | 3/2016 | Barker | ............... | B81B 3/0013 |
| | | | | 361/278 |
| 2018/0085785 A1* | 3/2018 | Zhuang | .............. | B06B 1/0292 |

OTHER PUBLICATIONS

Ahmad et al. "Analytical Evaluation of Squeeze Film Forces in a CMUT With Sealed Air-Filled Cavity" (Year: 2011).*

* cited by examiner

ARTIFICIAL BUOYANCY METHOD AND APPARATUS

RELATED INVENTION

The present invention claims priority under 35 U.S.C. § 119(e) to: "Artificial Buoyancy Method and Apparatus" Provisional U.S. Patent Application Ser. No. 63/122,015, filed 7 Dec. 2020.

TECHNICAL FIELD OF THE INVENTION

The present invention relates to the field of aeronautical lift. More specifically, the present invention relates to a new innovative energy efficient method of creating lift.

BACKGROUND OF THE INVENTION

FIG. 1 illustrates current flying means 100 that create aeronautical lift with various efficiencies. Helium balloon 105 is the most efficient method for creating lift. Once launched, helium balloon 105 can stay aloft for days and travel thousands of miles. Its primary disadvantage is that its course of travel is not controllable, unless it is a dirigible.

Birds 110 and insects 112 use the next most efficient method for creating lift. They use movable wings to fly and maneuver at will, powered only by the food they eat. For example, bar-tailed godwits can migrate nonstop from Alaska to New Zealand (7,500 miles) without eating or resting.

Aircraft 115 create lift using the Bernoulli effect which creates lift by air movement over their stationary wings. They are both maneuverable and efficient and stay aloft as long as they are moving forward. The Voyager circumnavigated the earth non-stop without refueling.

Helicopters 120 are the most maneuverable, but are very inefficient. Their rotors are essentially rotary wings. As long as they keep spinning, a rotary wing creates lift.

Rockets 125 are the least efficient. Although maneuverable, thrust must be greater than their weight to stay aloft.

There are numerous applications for a new method of providing lift whose efficiency approaches that of a helium balloon or dirigible, yet has the maneuverability of a helicopter.

Accordingly, it is the object of the present invention to provide new, improved, compact, and efficient methods for providing aeronautical lift which can be used for a large variety of applications.

SUMMARY OF THE INVENTION

The lift of a helium balloon is based on the Archimedes' Principle, in which the upward buoyant force (lift) is equal to the weight of the fluid (air) displaced by the object (balloon). This is the same buoyant force that allows boats and people to float in water.

Another way to describe buoyancy of an object, is that the upward buoyant force exceeds the downward weight of the object. Yet another way to express buoyancy in air, is that the upward air pressure force on the bottom of the object is greater than the downward air pressure force on the top of the object.

Briefly, to achieve the desired objects of the present invention, methods and apparatus are described that reduce air pressure on the top surface of the lifting device below the air pressure on its bottom surface.

For example, air pressure is approximately 14 pounds per square inch (psi) at low altitudes. Therefore air pressure on each face of a 1 inch cubic block is 14 pounds (lbs) because the surface area of each six sides of the block is one square inch. The block doesn't move because air pressures on opposite sides of the block are equal.

If block top surface air pressure could be reduced by 2 psi (to 12 psi), block bottom surface upward force is 14 lbs and block top surface downward force is 12 lbs. Therefore, an upward force (lift) of 2 lbs (14 lbs upward force minus 12 lbs downward force) is created.

Creating the same 2 psi lifting force on a lifting device whose surface area is 1 square foot, would produce 288 lbs of lift since there are 144 square inches per square foot.

Accordingly, methods and apparatus are described that will reduce top surface air pressure, either by pushing air sideways off the top surface, or by rapidly moving the top surface downward. In both cases, these actions will reduce top surface downward air pressure without changing bottom surface upward air pressure. Implementations of these methods are discussed below.

DETAILED DESCRIPTION OF THE PREFERRED EMBODIMENTS

Figure 1:
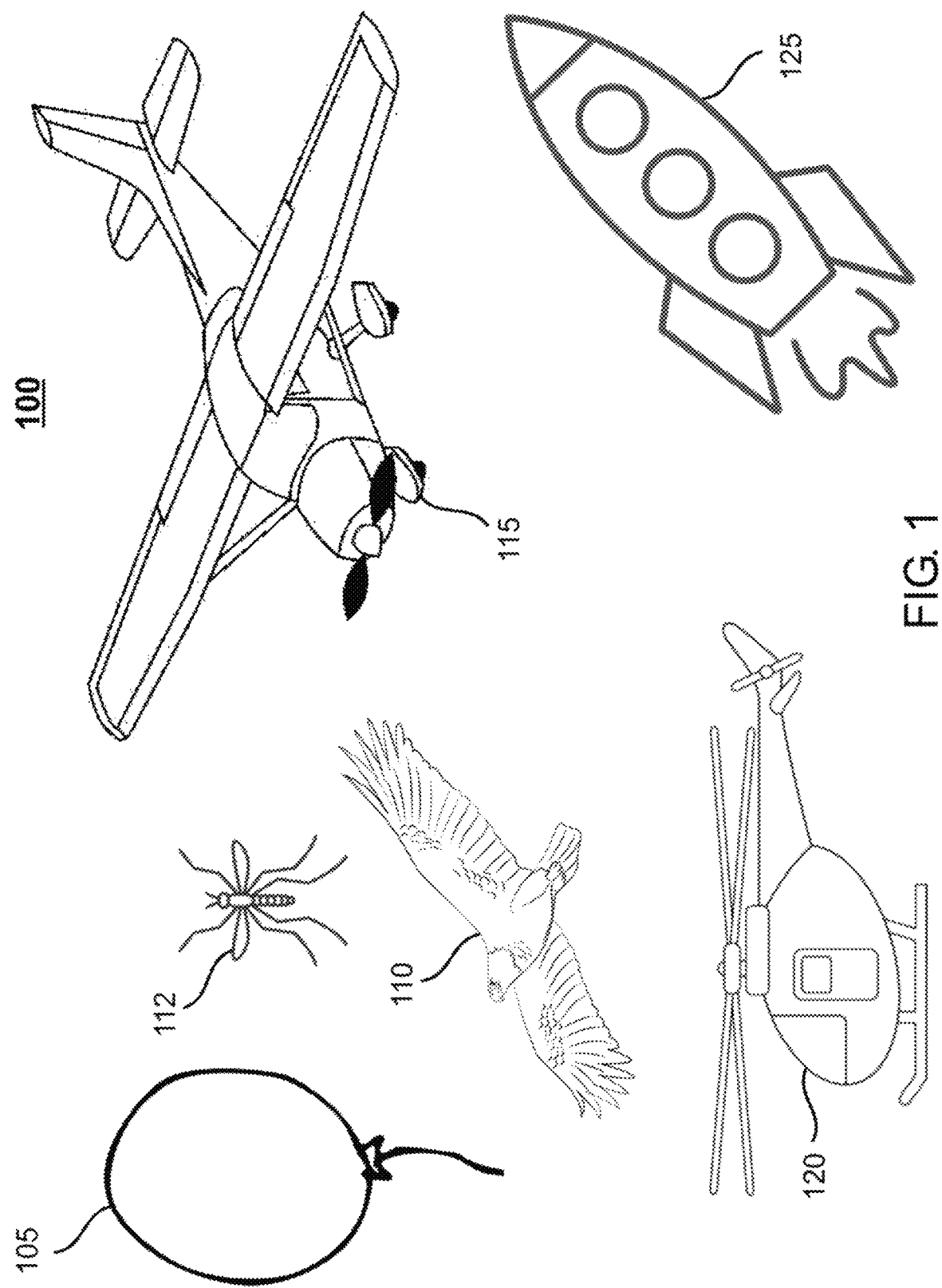
FIG. 1 illustrates current flying means that create aeronautical lift with various efficiencies.
Figure 2:
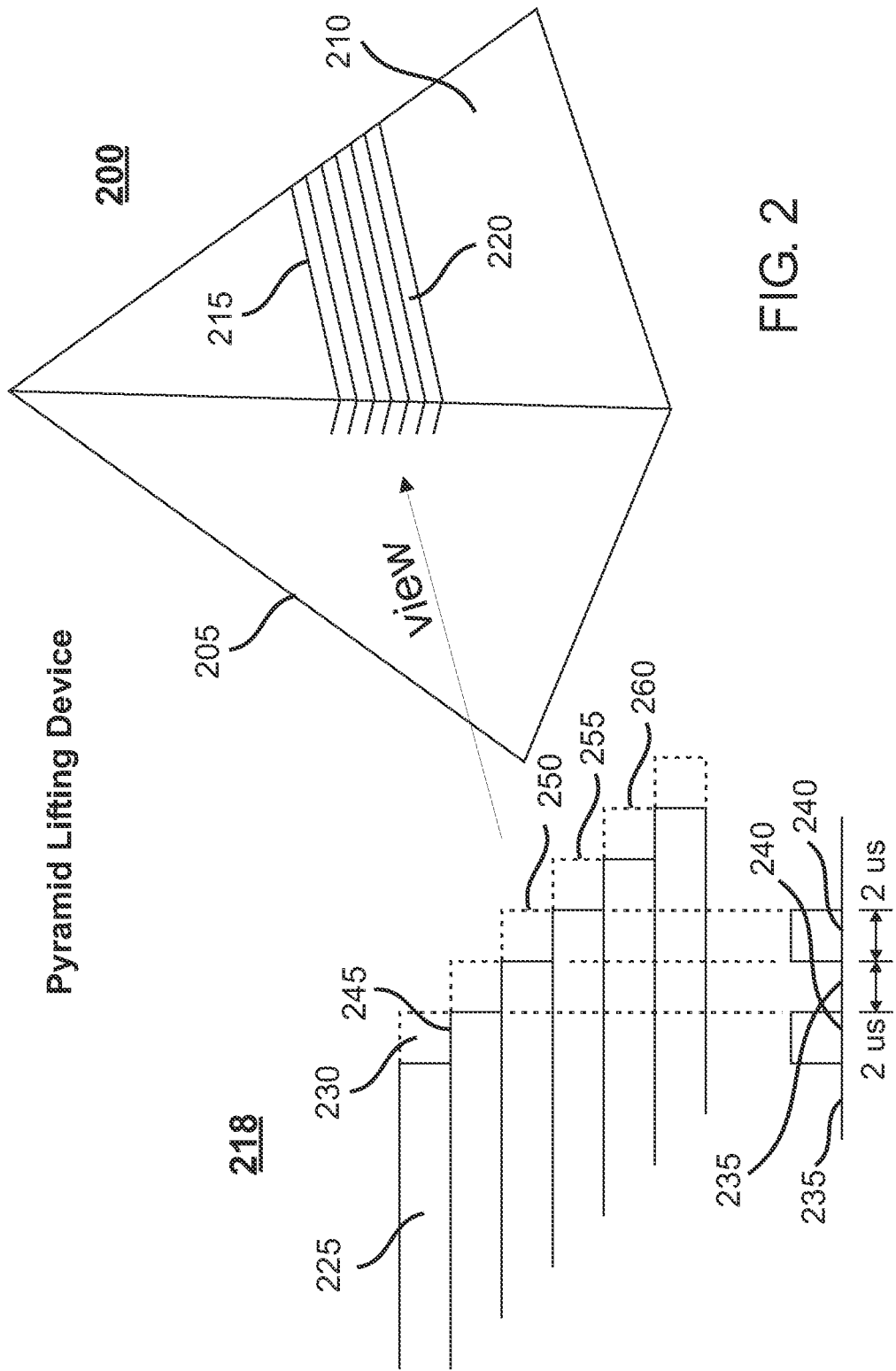
FIG. 2 illustrates a pyramid shaped lifting device.

An example of creating lift using a pyramid or pyramidal shaped lifting device 200 is illustrated in FIG. 2. Assume the base of 4 sided pyramid 205 is 1 square inch, and its height is approximately 1 inch tall. Also assume each face 210 of pyramid 205 is composed of a stack 215 of 25 rectangular 1 millimeter (mm) thick sections 220. A side view 218 of stack 215 on each face 210 is illustrated where each section 220 is both not extended 225 and extended 230 by 1 millimeter (mm) in length.

Using ultrasonic movements, each section 220 is first not extended 225 over a 2 microsecond (usec) period 235, and then extended 230 over the next 2 usec period 240. That is, each section is ultrasonic vibrated at a 250 kilohertz rate. Opposite pyramid 205 faces 210 are vibrated in phase. That is, opposite faces 210 are both extended and retracted at the same time.

The effect is that air is first pushed sideways away from pyramid 205 when each section 220 is extended 230, and a low pressure void 245 is momentarily formed on the top surface of each section 220 when not extended 225. By extending and retracting opposite faces 210 at the same time, no sideways movement forces are exerted on pyramid 205 If a pyramidal shape is used, it must have an even number of sides to prevent sideways movement forces. The momentary low pressure void 245 on the top surface of each section 220 when not extended 225, creates an upward lifting force on pyramid 205.

Lift on pyramid 205 can be estimated assuming 14 psi air pressure, where the root mean square (RMS) velocity of air molecules is approximately 500 meters per second, which is 1 mm every 2 usec. That is, when section 220 is retracted, it takes 2 usec for air molecules moving at 500 meters per second to fully repopulate void 245 on the top surface of each section 220.

Since the entire 1 square inch top surface of pyramid 205 is void of air for approximately half the time, the lift is approximately half the 14 psi air pressure. That is, the upward lift is approximately 7 lbs. If 144 pyramids 205 were attached to a 1 square foot surface, the total upward lift would be approximately 1000 lbs.

The power required to push air off the top surfaces of sections 220 can be estimated from the force times distance of extending sections 220. The average width of face 210 is 0.5 inch. The thickness of each section 220 is 1 mm. Therefore, section 220 area pressing against this air pressure is (width 0.5 inch× thickness 1 mm) which equals 0.0197 square inches. Air pressure force against these extending sections 220 is 14 pounds per square inch. Therefore, the total force is (14 pounds×0.0197 square inches) which equals 0.276 lbs.

One foot pound per second is equal to 1.36 watts of power. Therefore, to move an average section 220 width of 0.5 inches 1 mm (0.00328 feet) during a 2 usec extension period is (1.36 watts×0.00328 feet×0.276 lbs×2 usec) which is 2.46 nanowatts ($10^{-9}$).

The power to move all sections of this one square inch pyramid per second is (2.46 nanowatts per average section 220×25 sections 220 per face 210×4 faces 210×250,000 section 220 extension per second) which is 61.6 milliwatts ($10^{-3}$). If 144 pyramids 205 were attached to a 1 square foot surface, the total power required is 8.9 watts to produce an upward lift of approximately 1000 lbs.

Section 220 ultrasonic movements can be generated using ultrasonic actuator components such as piezoelectric, magnetostrictive, electrostatic, or MicroElectroMechanical Systems (MEMS) components. Also, it is not mandatory that all sections 220 be extended simultaneously. For example, suppose section 250 extends while section 255 is retracted. Section 250 pushes its air off the top of section 255. Then as section 250 retracts, section 255 extends. In this way, air from section 250 is further pushed away from pyramid 205 by section 255 extension. As section 255 retracts, section 250 extends again, and the cycle is repeated. Implementing this cyclic technique for all sections would have the effect of moving air down the sides and away from pyramid 205.

This analysis has only calculated the power required to move the air away from pyramid 205. Additional power will be required to operate the ultrasonic transducers. However, electrostatic transducers can be implemented with nearly 90 percent electrical input power to mechanical output power efficiency.

The primary reason for requiring only 8.9 watts to produce an upward lift of approximately 1000 lbs is due to the fact that great quantities of air are not being propelled away from the lifting device. In helicopters, huge quantities of air at high velocities are blown downward. Likewise for rocket propulsion. In contrast, pyramid 205 moves air only a few millimeters away from its surface. No energy is expended to blow great quantities of air far away from the pyramid surface, as occurs in existing lifting devices.

Although this invention is referred to as artificial buoyancy, it is much more than that. The true buoyant upward lift on a one cubic inch object containing a vacuum is only 0.000043 lbs, as that is the weight of standard pressure and temperature air displaced by the object. However, by using even faster ultrasonic movements, air could be continuously "pounded" away from the sides of pyramid 205, resulting in nearly 14 pounds of lift per square inch (2016 lbs per square foot).

Figure 3:
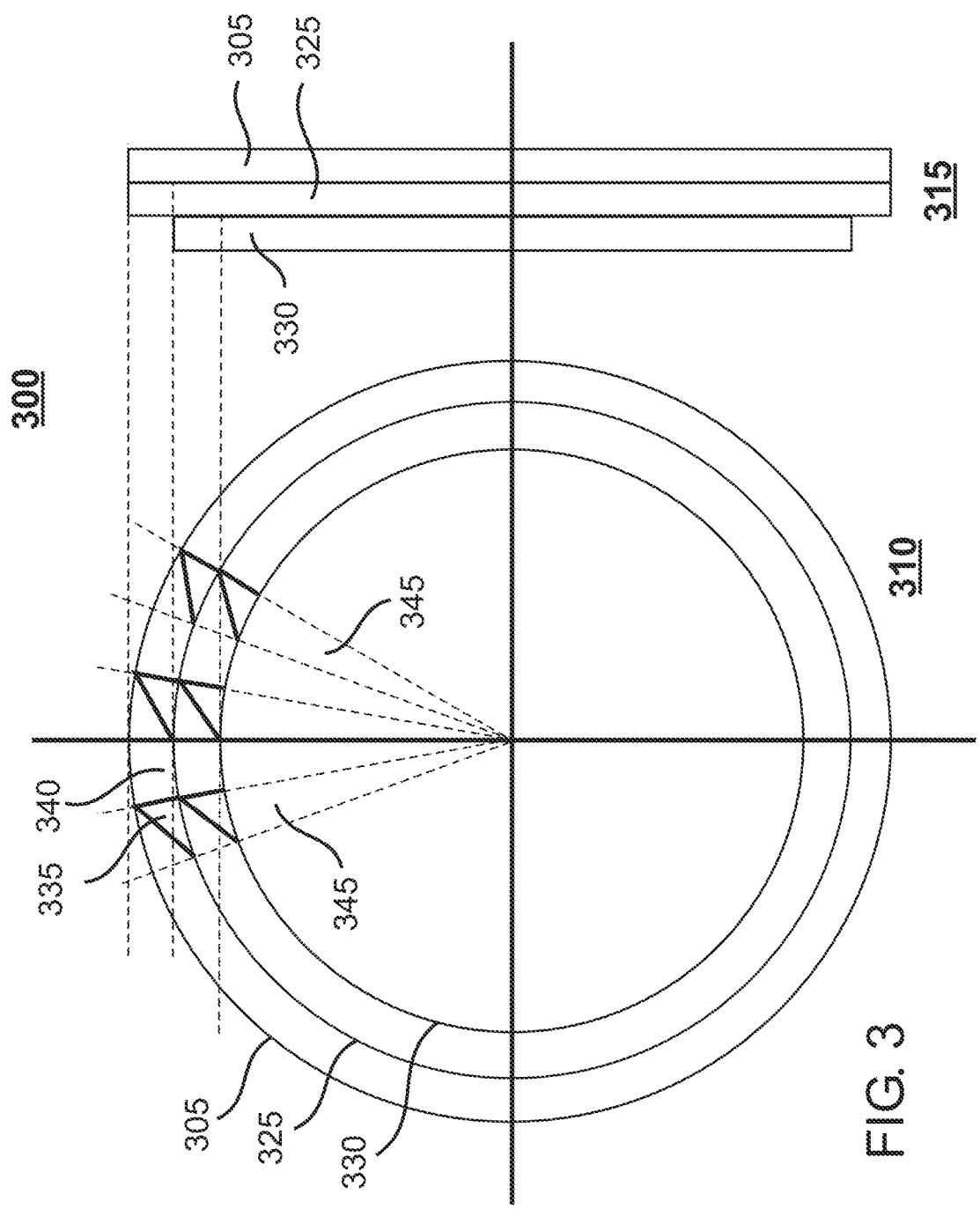
FIG. 3 illustrates a rotating lifting device.

An example of creating lift using rotating lifting device 300 is illustrated in FIG. 3. This device also creates lift by pushing air sideways off lifting device top surface.

As with pyramid 205, rotating lifting device 300 is composed of a stack of thin circular plates 305, which resemble a truncated cone shaped stack of circular saw blades. Top view 310 and side view 315 illustrates that each upper plate 305 has a slightly smaller diameter than preceding lower plate 305.

Initial bottom plate 305 is simply a flat circular plate with no teeth. All succeeding plates are flat circular plates 305 with teeth 335. As lifting device 300 rotates counterclockwise (CCW), teeth 335 of plate 325 forces air sideways away from bottom plate 305.

This creates momentary low pressure void 340 on top surface of bottom plate 305, which provides upward lift similar to upward lift created by momentary low pressure voids 245 in FIG. 2. Third plate 330, and all subsequent plates 305, operate similarly. That is, teeth 335 on plate 330 creates momentary low pressure voids 340 on plate 325, and so on for all subsequent upper plates 305.

To calculate lift, assume each sector 345 is 1 degrees wide, height of each tooth 335 is 1 mm (0.04 inches) tall, thickness of each plate 305 is 0.04 inches, and diameter R1 of first plate 305 is 12 inches. Note that the slope of teeth 335 will become steeper as each plate 305 diameter becomes smaller. Therefore, assume smallest top plate 305 diameter R2 is 6 inches. Using tooth 335 height of 0.04 inches, allows 75 plates 305 to be stacked on top of first plate 305, for a total stacked plate thickness of 3 inches. FIG. 3 illustrates teeth 335 as triangular. However, actual teeth 335 will be smoother and whose shape will be optimized to most efficiently move air out of low pressure void 340.

To mimic 2 microsecond not extended 225 and extended 230 periods of sections 220 of pyramid 205 in FIG. 2, stack of plates 305 will be rotated 1 degree each 2 microseconds which is 1389 revolutions per second or 83,333 revolutions per minute (RPM).

The area of each 1 degree wide sectors 345 is ($0.5 \times R1^2 \times \Theta \times \pi/180$) where R1=6 inches and $\Theta$=1 degree. Subtracting the R2 sector 345 area below R2 indicates sector 345 area above R2 is 0.236 square inches per sector 345. As there are 180 low pressure void sectors 340, total area is 42.4 square inches. In 14 psi air pressure, the combined upward lift from all 180 low pressure sectors 340 is 594 lbs. All low pressure sectors 340 are continuous as plates 305 rotate.

If spinning lifting device 300 at 83,333 RPM is not practical in some implementations, sectors 345 width can be reduced, which is a linear process. That is, reducing 1 degree wide sector 345 by a factor of 10 to 0.1 degree also reduces the RPM by a factor of 10 to 8,333 RPM, which may be more practical in some implementations. The lift remains the same because the total sector area is the same. That is, there are 10 times as many sectors 345, but the area of each sector 345 is a factor of 10 smaller.

The circumference of first 12 inch diameter plate 305 is 37.7 inches. The maximum physical width of a 1 degree wide sector 345 is 0.105 inches. However, it is only 0.0105 inches (¼ mm) for a 0.1 degree wide sector 345, making the width of 1 mm tall tooth 335 very narrow.

To make teeth 335 fabrication more practical, first plate 305 diameter could be doubled to 24 inches, and 0.1 degree sector 345 could also be doubled to 0.2 degrees by increasing the rotation rate to 16,666 RPM. This would increase the width of 1 mm tall teeth 335 to 1 mm, which might be more practical.

Only the outer 3 inch diameter of lifting device 300 plates 305 would be populated with teeth 335. This would leave ample center room for a rotation motor. The optimum method to fabricate lifting device 300 is to 3D print it as a single structure.

Another method for achieving aeronautical lift by reducing downward air pressure on a top surface, without changing upward air pressure on a bottom surface, will now be described. Instead of pushing air sideways off a lifting device top surface, a portion of the lifting device top surface is rapidly moved downward, thus reducing downward air pressure on a top surface.

Traditionally, piezoelectric ultrasonic transducers have been used to generate ultrasound for multiple applications, of which medical ultrasound imaging was the primary application. More recently, MicroElectroMechanical Systems (MEMS) technology has emerged in which Micromachined Ultrasonic Transducers (MUTs) have the advantages of small size, low cost and broad bandwidth.

MUTs are divided into Capacitive Micro-machined Ultrasonic Transducers (CMUTs) and Piezoelectric Micro-machined Ultrasonic Transducers (PMUTs). CMUTs have higher operating frequencies and can be constructed using Complementary Metal-OxideSemiconductor (CMOS) compatible fabrication processes, which allows them to be fabricated as large arrays. They can also be batch fabricated on the same wafer with high yields and reduced cost. CMUT technology has enabled realizing densely packed CMUT elements in 2D configurations.

Over the last dozen years or so, numerous research has been conducted, and papers published, on MEMS and MUTs technology. Although most MEMS devices are implemented using an excitation voltage, some are designed using current, magnetic, radio frequency, thermal, or other types of excitation signals. In this specification, voltage excitation signals will always be assumed, described, and illustrated when referring to MEMS. However, any of these alternate excitation signals might also be used to perform the described function.

A CMUT element is composed of multiple cells, acting as interconnected plate capacitors in which a thin movable plate is placed between the top and bottom electrodes. When an excitation voltage is applied, modulation of the electrostatic force between the electrodes induces plate vibrations that generate an acoustic wave.

Figure 4:
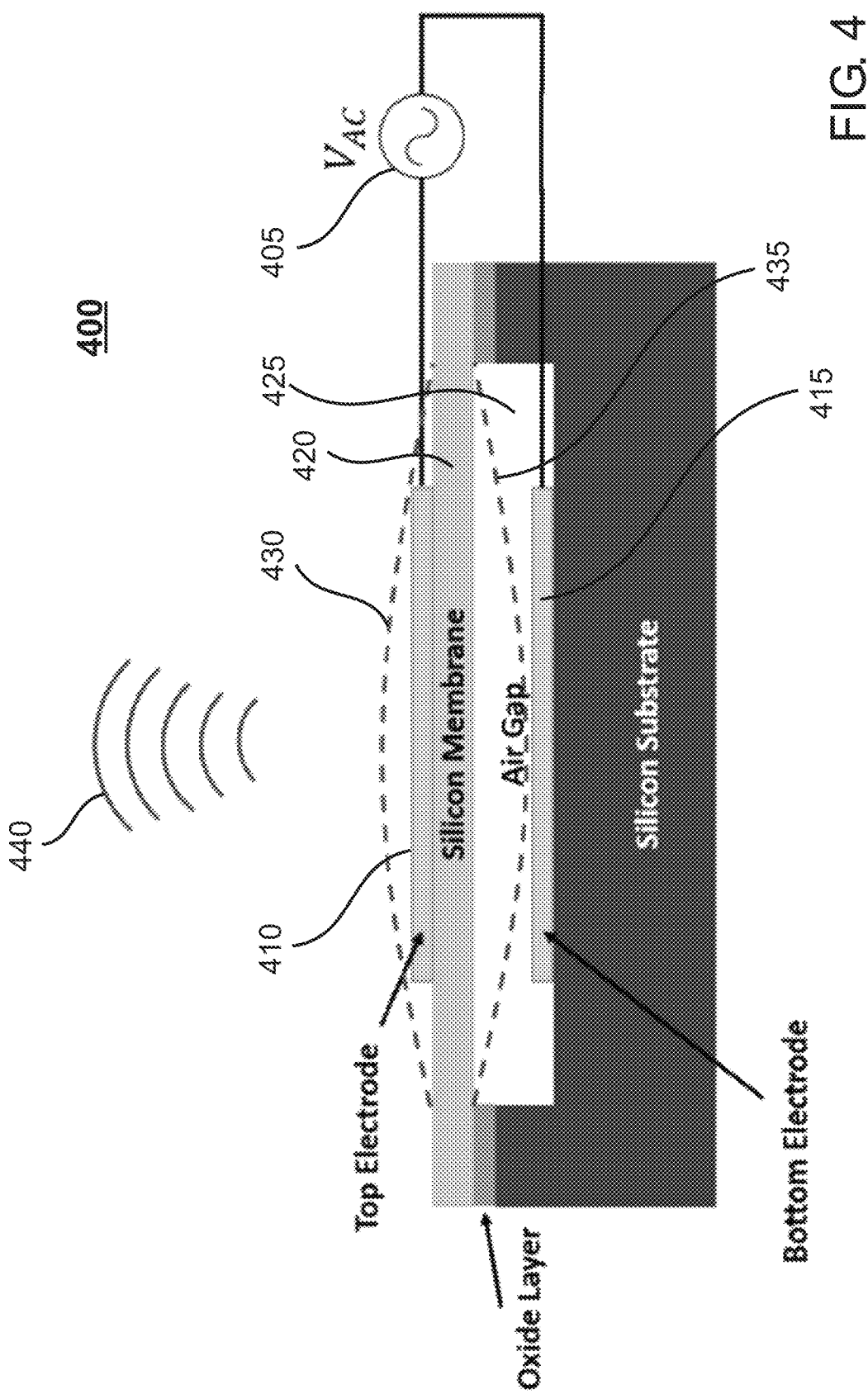
FIG. 4 illustrates a Capacitive Micromachined Ultrasonic Transducer (CMUT).

An example of a typical CMUT cell 400 is illustrated in FIG. 4. A voltage generator 405 is connected between top electrode 410 and bottom electrode 415, which forms a parallel plate capacitor. When voltage is applied, electrostatic force of attraction bends silicon membrane 420 down into air gap 425. When voltage from voltage generator 405 goes to zero, silicon membrane 420 springs back up out of air gap 425.

When used to generate ultrasonic sound at a particular frequency, voltage generator 405 outputs an AC sine wave on a DC voltage. The DC voltage pulls silicon membrane 420 partially into air gap 425 and the AC sine wave causes silicon membrane 420 to oscillate between upper point 430 and lower point 435, which generates ultrasound waves 440. To generate maximum ultrasound amplitude, air gap 425 is a vacuum. Typically, many CMUT cells 400 are fabricated on a CMUT device, which might contain 100 or more CMUT cells 400. A large number of CMUT devices can be batch fabricated on a single 4 inch diameter (or larger wafer) which makes CMUT technology an ideal ultrasonic component for this artificial buoyancy application.

There are numerous different CMUT designs described in the literature for use in many different applications. Many of the applications are for medical ultrasonic imaging. For imaging, multiple CMUT cells 400 are arranged and wired into arrays to both transmit and receive a focused ultrasound signal.

For this artificial buoyancy application, CMUT cells 400 only require pulsed movement which greatly simplifies the CMUT device 400 design. For example, top electrode 410 of all CMUT cells 400 could be connected to a common signal plane driven by a single voltage pulse generator 405.

CMUT cell 400 is an ideal device to implement this artificial buoyancy, whereby downward air pressure is reduced on a top surface by moving the top surface downward, without changing the upward air pressure on a bottom surface. That is, CMUT cells 400 are mounted to a top plate of the lifting device such that all top electrodes 410 are pointing up. Voltage generator 405 is programmed to output a voltage for a short period and then output zero voltage for the next short period.

When voltage is applied, silicon membrane 420 rapidly retracts to bottom electrode 415 which creates a low air pressure on top electrode 410. A short time later, no voltage is applied which causes top electrode 410 to return to its initial no voltage position. That is, the ultrasonic movement is similar to that illustrated in FIG. 2 where each section 220 is first not extended 225 over a 2 microsecond period 235, and then extended 230 over the next 2 microsecond period 240. However, instead of CMUT cell 400 pushing air sideways away from a top surface, it is a top surface pulling away from the air.

To implement artificial buoyancy, top electrode 410 moves between its static position illustrated in FIG. 4 to lower point 435 against bottom electrode 415. This provides maximum top electrode 410 movement and maximum voltage to mechanical movement efficiency.

Figure 5:
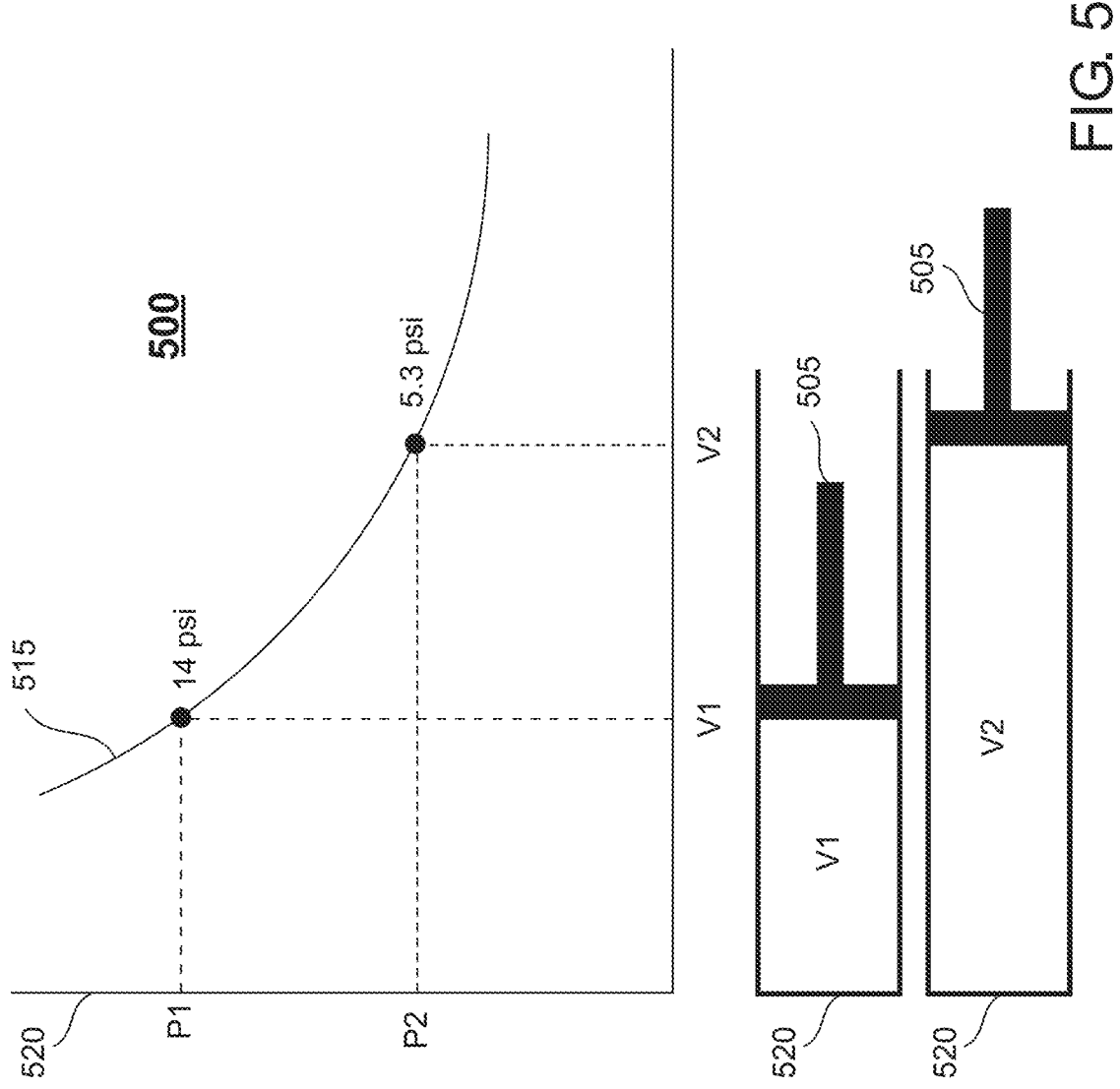
FIG. 5 illustrates a piston expansion Adiabatic process.

The movement of silicon membrane 420 and top electrode 410 is similar to a piston expansion Adiabatic process 500 illustrated in FIG. 5. As piston 505 is withdrawn from tube 520, air pressure on piston 505 as it moves from tube 520 volume V1 location to volume V2 location, is indicated by curve 515 on Pressure-Volume chart 520.

Assume pressure P1 is 14 psi and volume V2 is twice volume V1. Then pressure P2 at volume V2 is given by the equation $P2=P1\times(V1/V2)^\gamma$ where $\gamma$ is equal to 1.41 for air, P1 & P2 are in kilopascal, and P2 is calculated to be 5.3 psi.

Figure 6:
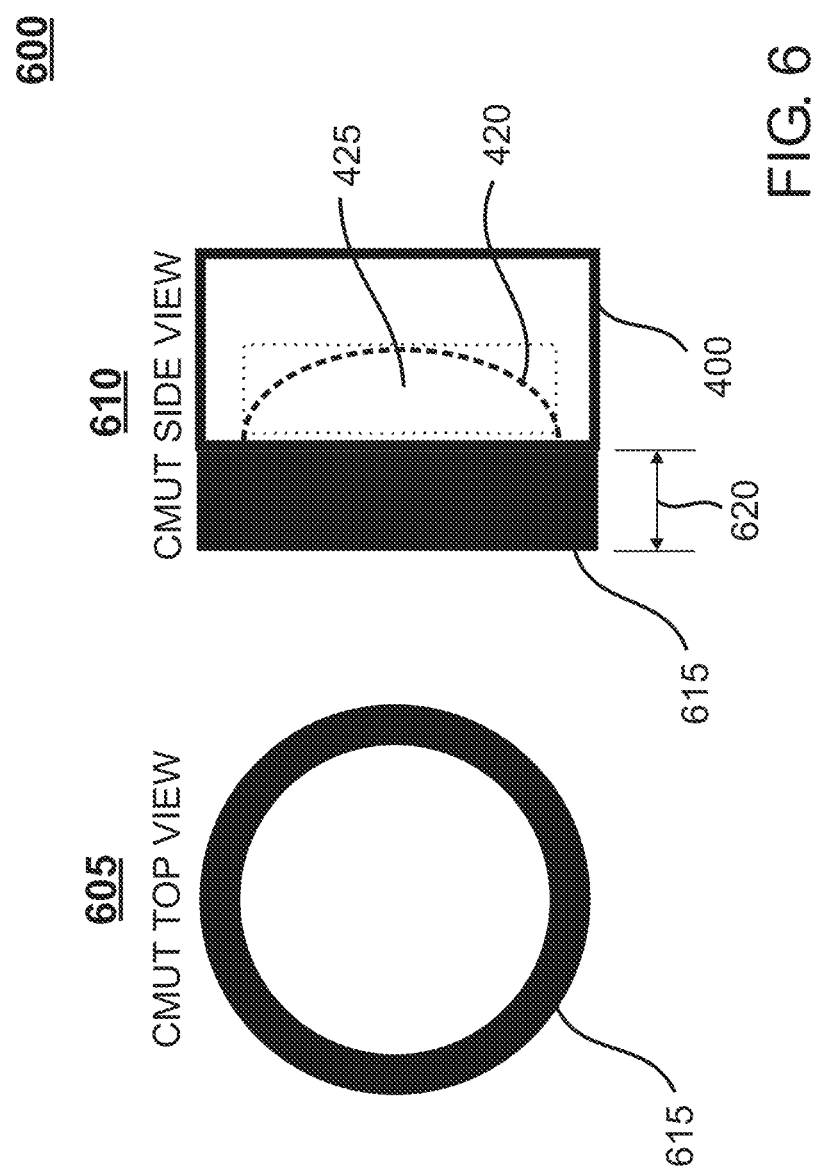
FIG. 6 illustrates a modified CMUT cell.

CMUT cell 400 in FIG. 4 can be changed to modified CMUT cell 600 as illustrated in FIG. 6, to simulate piston expansion Adiabatic process 500 illustrated in FIG. 5, by including short tube 615 as indicated in CMUT top view 605 and side view 610. Height 620 of tube 615 can be chosen to approximate the same V2=2×V1 ratio in FIG. 5. That is, V1 represents tube 615 volume prior to applying voltage from voltage generator 405. V2 represents the sum of tube 615 volume and volume below tube 615 when voltage from voltage generator 405 is applied.

Based on pressure P2 calculations for FIG. 5, air pressure on top electrode 410 will drop from 14 psi prior to retracting to approximately 5 psi when retracted into air gap 425. As the top end of tube 615 is not closed, actual pressure may be different. However, due to CMUT cell 400 high retraction speed, air above tube 615 may not propagate fast enough to influence these calculations. Tube 615 should be easy to add to CMUT cell 400 as part of the fabrication process, and should reduce air pressure during retraction compared to an open atmosphere without tube 615. In any case, height 620 of tube 615 would be selected to maximize aeronautical lift.

There are numerous CMUT devices described in the open literature, most of which are designed for ultrasonic imaging applications. The dimensions of a CMUT device designed as an experimental high amplitude ultrasonic sounder in air is used to illustrate CMUT module 700 in FIG. 7, consisting of 100 modified CMUT cells 600.

Top electrodes 410 of all 100 modified CMUT cells 600 are connected together as are all bottom electrodes 415. Voltage generator 405 drives all 100 modified CMUT cells in parallel. One or more CMUT modules 700 can be powered and driven by separate voltage generators 405 and power supplies for flight safety. If a particular voltage generator or power supply fails, aeronautical lift will be only slightly reduced and easily restored by increasing lift of other CMUT modules.

Each modified CMUT cell 600 is 550 micrometers in diameter with a silicon membrane 420 deflection of 1.5 micrometers. Approximately 75% of each modified CMUT cell 600 area radiates and area of CMUT module 700 is approximately ¼" square inch. Each square inch could contain 4 CMUT modules 700 and provide 0.75 square inches of lift. Based on the earlier Adiabatic expansion analysis, the lift could be approximately 5 psi, giving a peak lift per square inch of 3.75 psi, or 540 lbs per square foot. This peak lift can only be obtained when driving CMUT cell 600 with a narrow pulse, as will be explained later.

Figure 8:
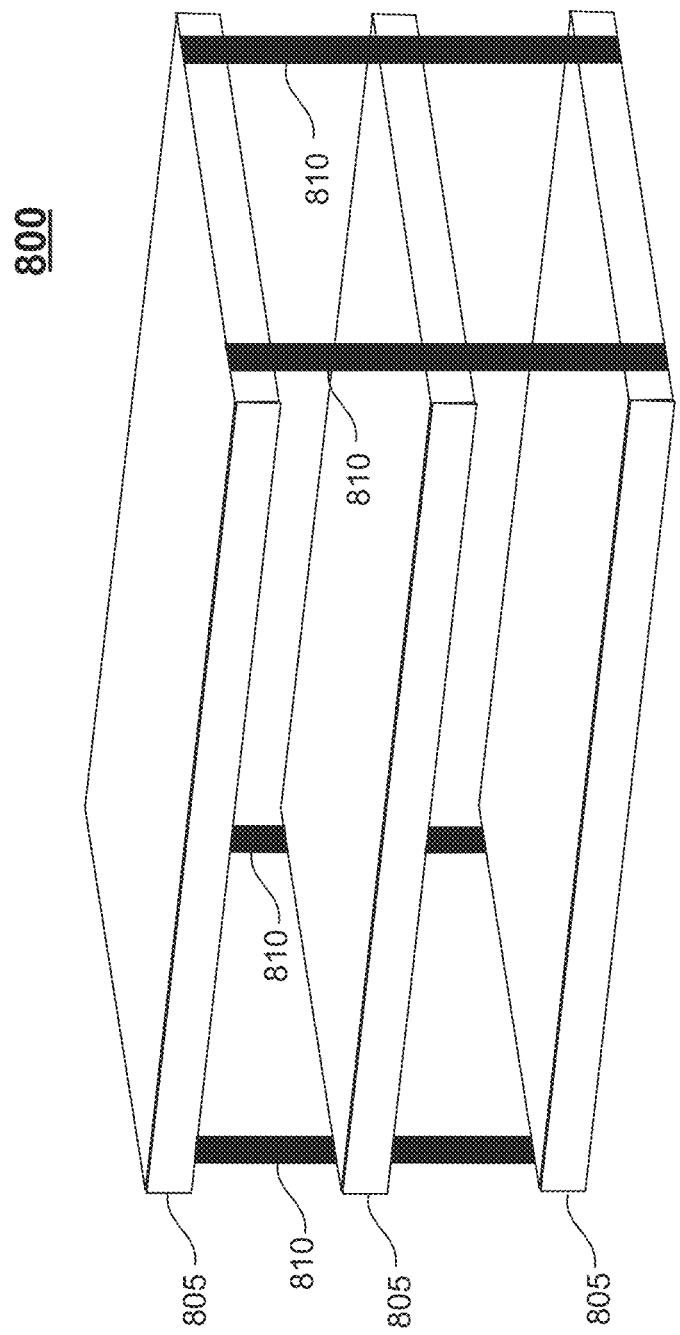
FIG. 8 illustrates thin flat CMUT module enclosures.

If average CMUT cell 600 lift was only 1 psi, CMUT technology is still an ideal ultrasonic component for this artificial buoyancy application. CMUT cells are low profile, low power, and low cost. CMUT cells can be combined to provide as much lift area as required. They can also be placed in thin flat enclosures 805, attached together using connectors 810, and stacked in layers 800 as illustrated in FIG. 8.

Figure 9:
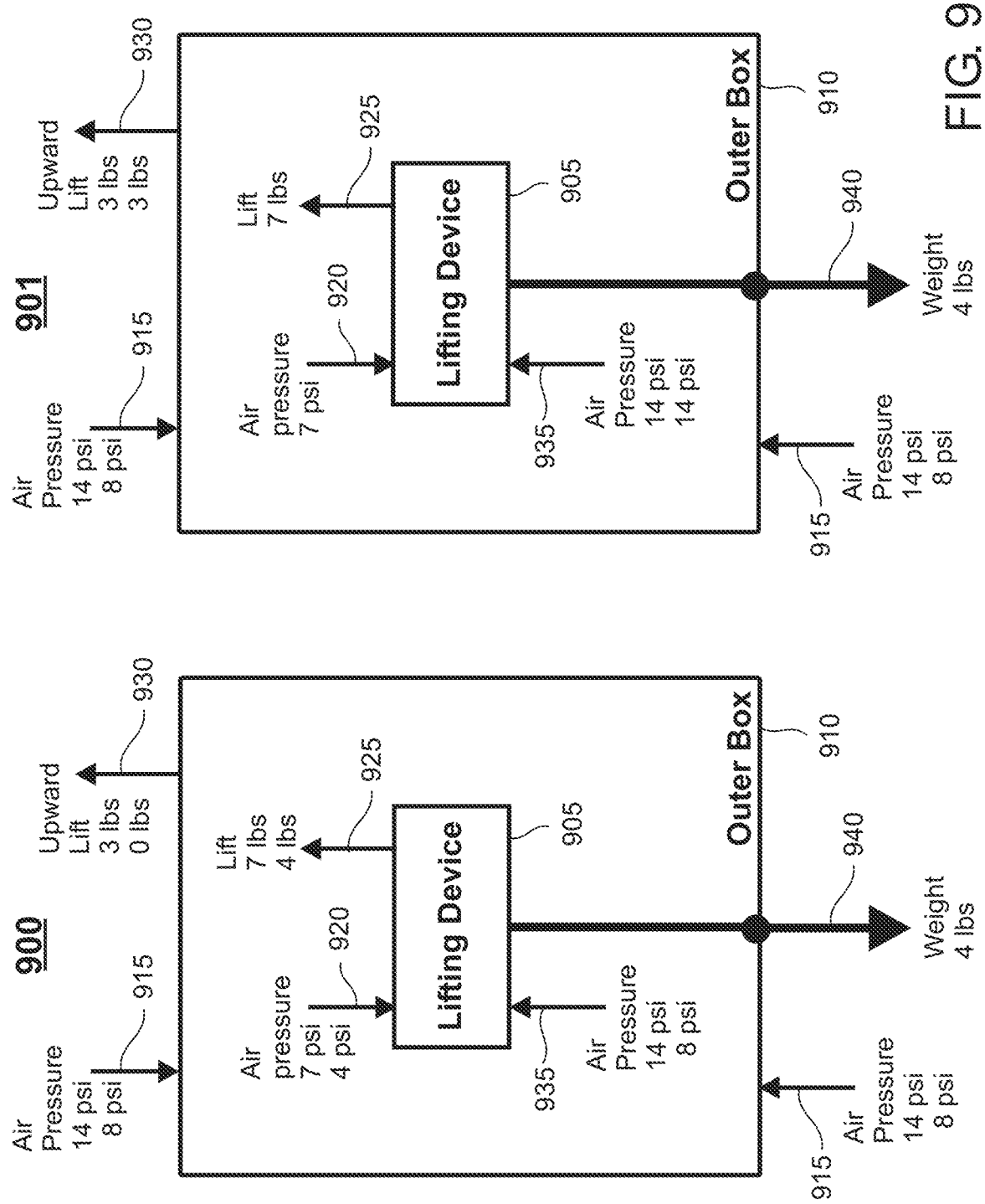
FIG. 9 illustrates artificial buoyancy lift at different ambient air pressures.

Assembly 900 illustrated in FIG. 9 indicates another advantage of artificial buoyancy, with respect to normal buoyancy. Assume one cubic inch lifting device 905 is attached inside vented outer box 910 which together weighs 4 lbs. At low altitudes, air pressure vectors 915 indicate air pressure on top and bottom of outer box 910, and air pressure vector 935 on bottom of lifting device 905, is 14 psi. Assume that half the top surface area of lifting device 905 pulls away from top air pressure so pressure vector 920 is 7 psi. Since bottom surface pressure vector 935 is 14 lbs and top surface pressure vector 920 is 7 lbs, lift vector 925 is 7 lbs. Subtracting the 4 lb weight 940 of the total assembly, the resultant lift vector 930 is 3 lbs which propels assembly 900 upward.

At some higher altitude, air pressure vectors 915 indicate air pressure on top and bottom of outer box 910, and on bottom of lifting device 905 has dropped to 8 psi. As half of top surface area of lifting device 905 pulls away from top air pressure, pressure vector 920 has dropped to 4 psi. Since bottom surface pressure vector 935 is 8 lbs and top surface pressure vector 920 is 4 lbs, lift vector 925 is 4 lbs. Subtracting 4 lb weight of the assembly, resultant lift vector 930 is 0 lbs so assembly 900 no longer rises.

Assembly 901 illustrated in FIG. 9 indicates the situation when outer box 910 is not vented, but rather sealed and pressurized to 14 psi using normal air or some other gas such as xenon (as will be indicated later). At low altitudes, air pressure vectors 915 again indicate air pressure on top and bottom of outer box 910, and on bottom of lifting device 905, is 14 psi as before. At some higher altitude, air pressure vectors 915 indicate air pressure on top and bottom of sealed and pressurized outer box 910 has dropped to 8 psi. However, since air pressures have not changed on lifting device 905, lift vector 925 is still 7 lbs. Subtracting the 4 lb weight of the assembly, the resultant lift vector 930 is 3 lbs which continues to propel assembly 901 higher.

Sealing any lifting device 905 in a pressurized temperature controlled enclosure has many advantages. It protects the lifting device, allows the lifting device design to be optimized to operate at a particular pressure and temperature that doesn't change, could streamline outer box 910 assembly for high velocity flight normal to lift, mutes all lifting device 905 ultrasonic sound, and allows assembly 901 to operate outside the atmosphere (no height restrictions, but still requires a gravitational field).

Figure 10:
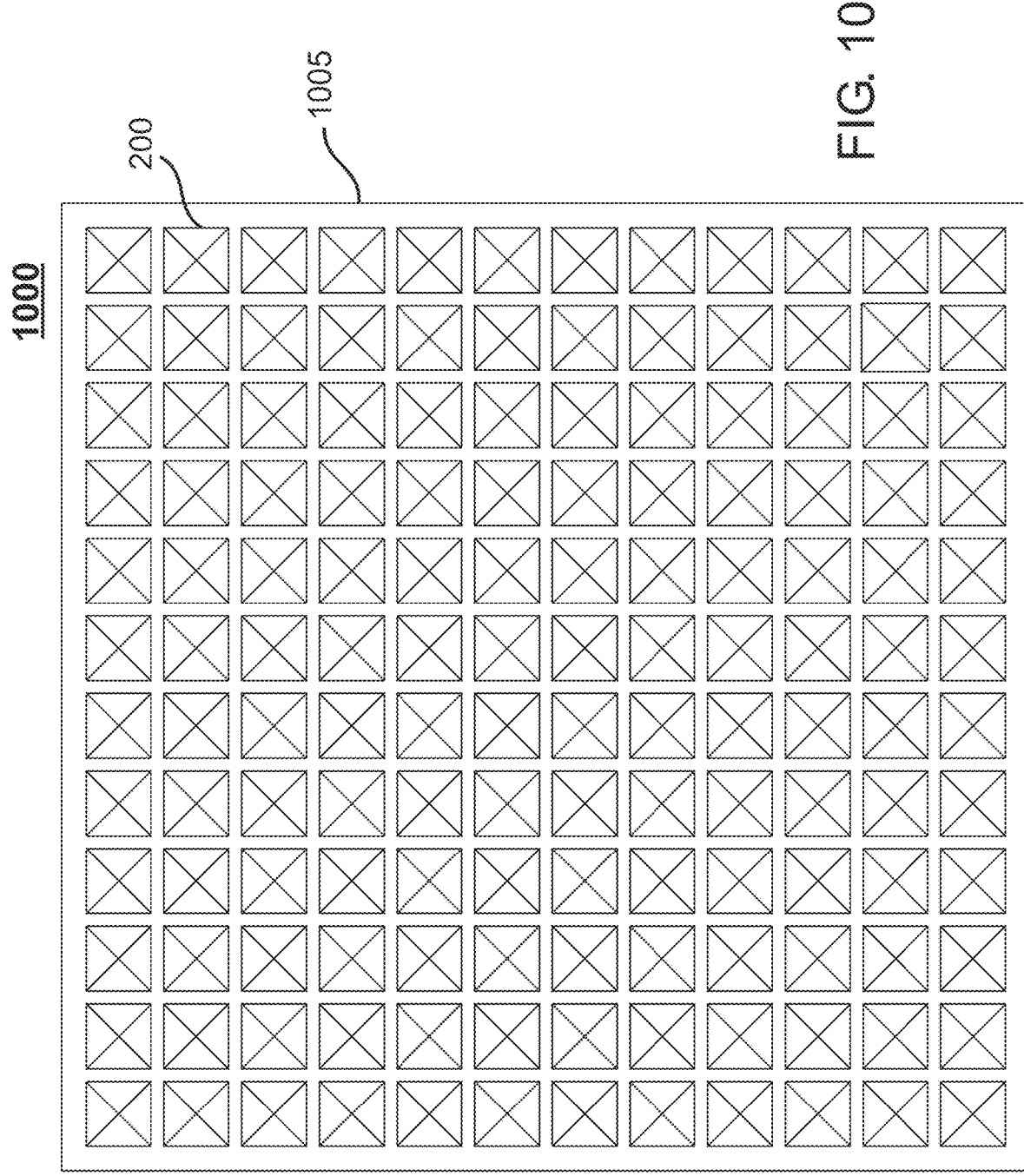
FIG. 10 illustrates attaching 144 pyramid shaped lifting devices to a mounting plate.

FIG. 10 illustrates attaching 144 pyramid shaped lifting devices 200 to mounting plate 1005. Each individual (or subgroup) of lifting devices 200 can be powered separately for safety purposes. This technique provides redundancy so that failure of a particular lifting device 200, or its power or control, will not cause a crash of the vehicle.

By selectively controlling ultrasonic movements to individual lifting devices 200 (or their individual faces 210), altitude, direction, and speed of the vehicle can be controlled by the operator. For example, if ultrasonic movements of opposite faces 210 are not equal, the vehicle will be pushed by the face with the greatest ultrasonic movement. Alternatively, mounting plate 1005 can be tilted into the direction of movement.

Figure 11:
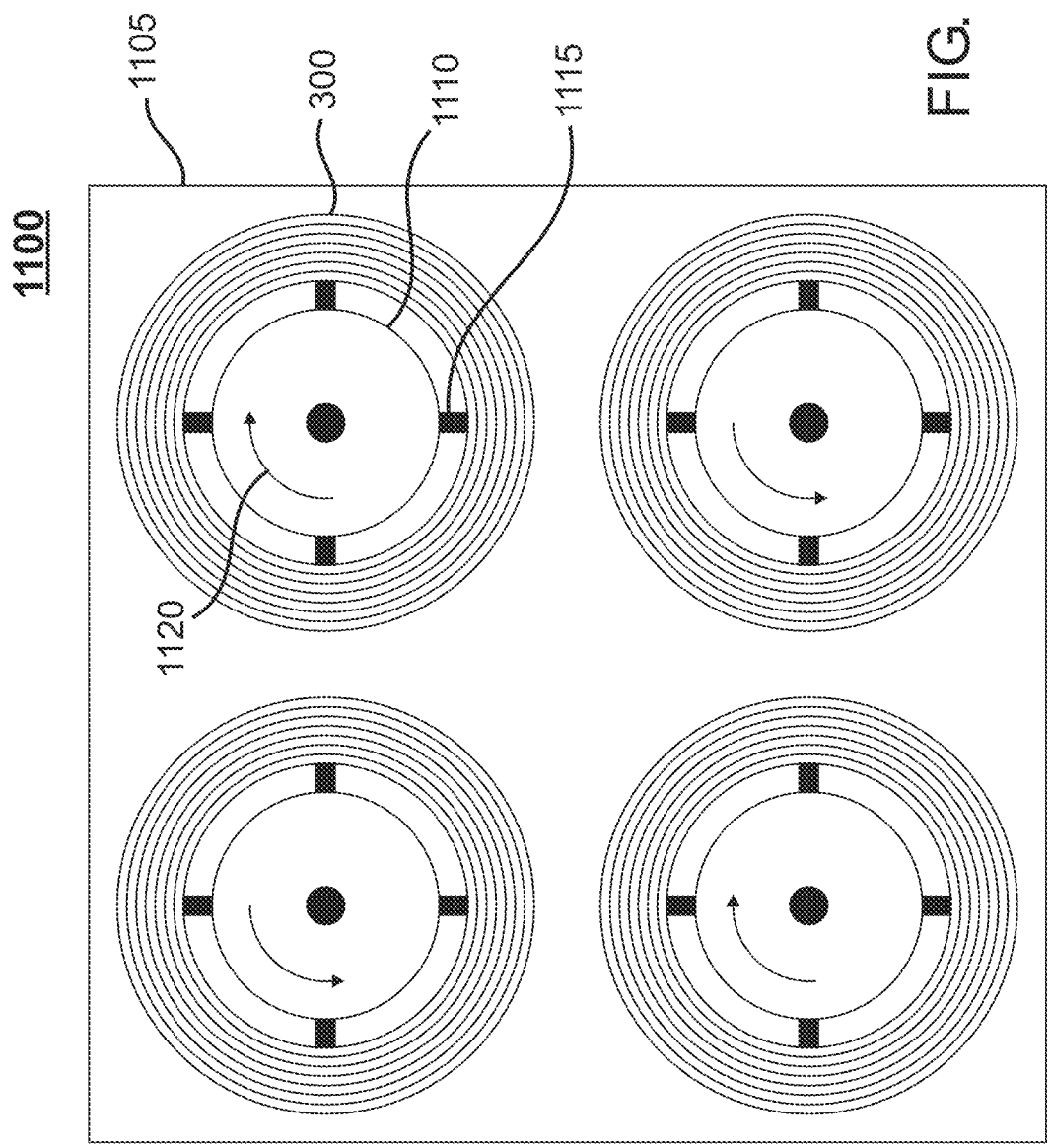
FIG. 11 illustrates attaching 4 spinning lifting devices to a mounting plate.

An example 1100 of attaching 4 spinning lifting devices 300 to mounting plate 1105 is illustrated in FIG. 11. Lifting devices 300 are attached and powered by motors 1110 using attachments 1115. If lifting devices 300 are spun clockwise (CW) by motor 1110, motor 1110 experiences an opposite counterclockwise (CCW) torque. This is similar to helicopter CCW torque experienced by CW rotor rotation. Single rotor helicopters use a tail rotor to prevent the helicopter from spinning CCW.

One option to prevent a vehicle from spinning CCW by motor 1110 CW rotation is to mount lifting devices 300 in pairs on mounting plate 1105. Motor 1110 rotation is indicated by arrows 1120.

Note that lifting device 300 in FIG. 3 indicates plates 305 must rotate in direction of teeth 335 slope, which is CCW in FIG. 3. For CW rotation in FIG. 11, slope of teeth 335 on devices 300 must be reversed from the direction illustrated in FIG. 3. Another option for mounting devices 300 in pairs is to stack them vertically in CW/CCW pairs (one directly above the other) instead of horizontally. To change directions, the operator can simply increase or decrease motor 1110 speed to rotate the vehicle to the desired direction.

To move forward or backwards, plate 1105 can be tilted towards the direction of movement. As large gyroscopic force is generated by spinning devices 300, tilting plate 1105 will be resisted. This can be a disadvantage for changing directions, but can also be an advantage in terms of vehicle stability in turbulence or to provide a stabilized camera platform.

There are numerous applications for these methods and apparatus implementations of artificial buoyancy. The most immediate useful application is for drones, as the use of drones is increasing exponentially for industry, business, and recreation. In the near future, package delivery use alone will mean drones with noisy rotors will invade nearly every neighborhood. The silent and energy efficient method for providing aeronautical lift by these artificial buoyancy methods will allow drones to fly silent, longer, and with heaver payloads.

Figure 12:
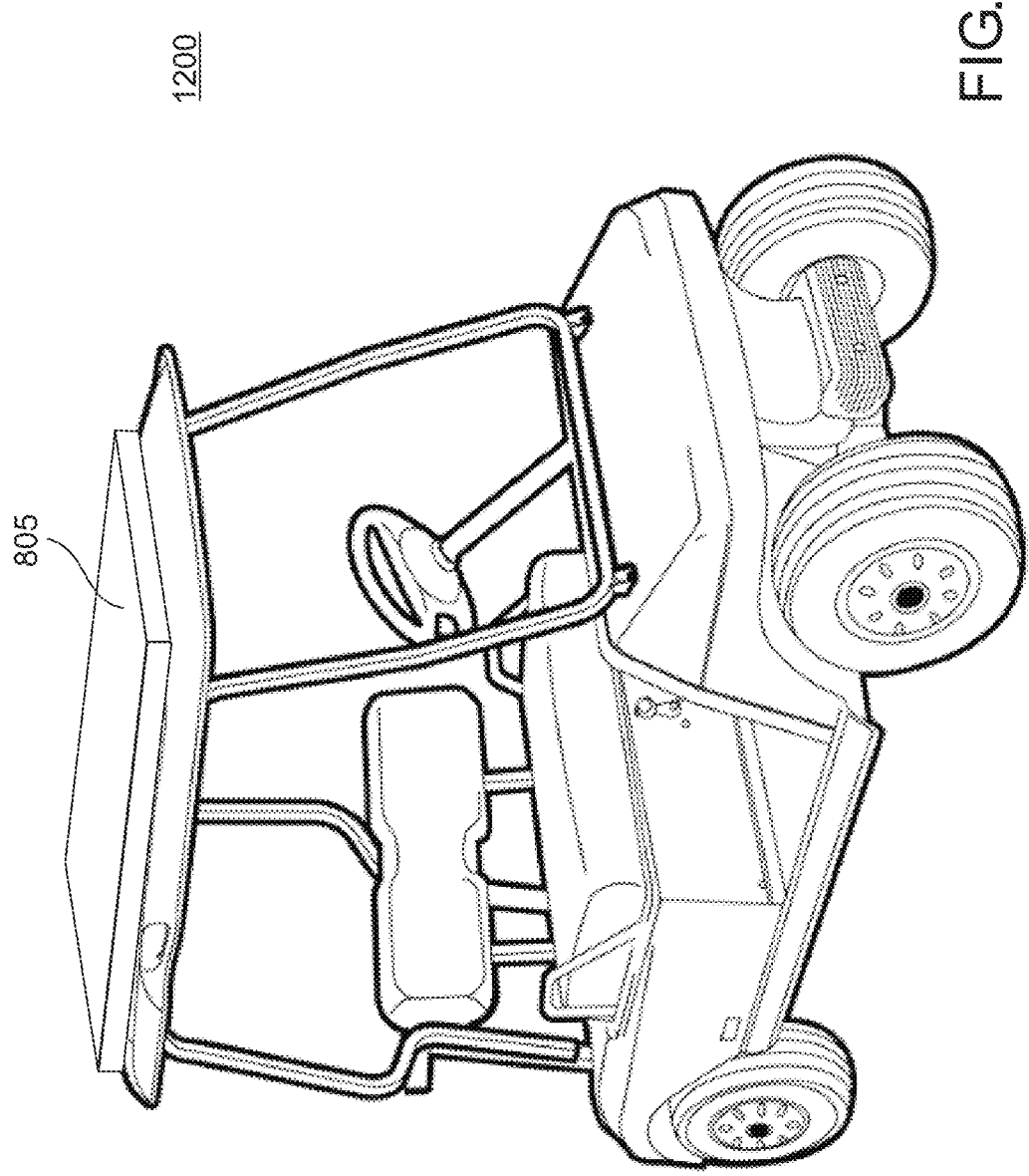
FIG. 12 illustrates installing CMUT cells in a thin flat enclosure and mounting it on top of mobility vehicles such as carts or wheelchairs.

Another important humanitarian use is for handicap mobility vehicles 1200 as illustrated in FIG. 12. By installing MEMS cells in thin flat enclosures 805 and mounting them on top of mobility vehicles such as carts, wheelchairs, etc., individuals with mobility deficiencies could return to many common activities. Currently, stairs, curbs, off-road (hiking, woods, beach sand, etc.) activities are not possible for these people. The ability to float a foot or so off the surface would solve all these problems.

The ability to float to the edge of space and dwell stationary indefinitely, powered by solar cells, would be very beneficial for communications, surveillance, space tourism, etc.

Creating lift using rotating lifting device 300 illustrated in FIG. 3 is straight forward, but is complicated by the issue of parasitic drag. As is well known by anyone skilled in the art of fluid dynamics, spinning a disc or other object in any viscous fluid (such as air), results in a thin boundary layer of air sticking to the disc and obtaining its velocity. The torque or moment on the spinning disc due to the friction between rotating air on the disc and still air above the disc depends on the disc angular velocity, radius, fluid density, and kinematic viscosity.

For short radius and low disc rotation speeds torque is minimal, but increases dramatically at high speeds and large radius. Overcoming large disc radius parasitic drag torque using a small motor at the center of the spinning disc is difficult due to limited motor torque. However, FIG. 13 illustrates a method and apparatus which largely mitigates this center disc motor torque problem when using rotating lifting device 300 illustrated in FIG. 3.

Figure 13:
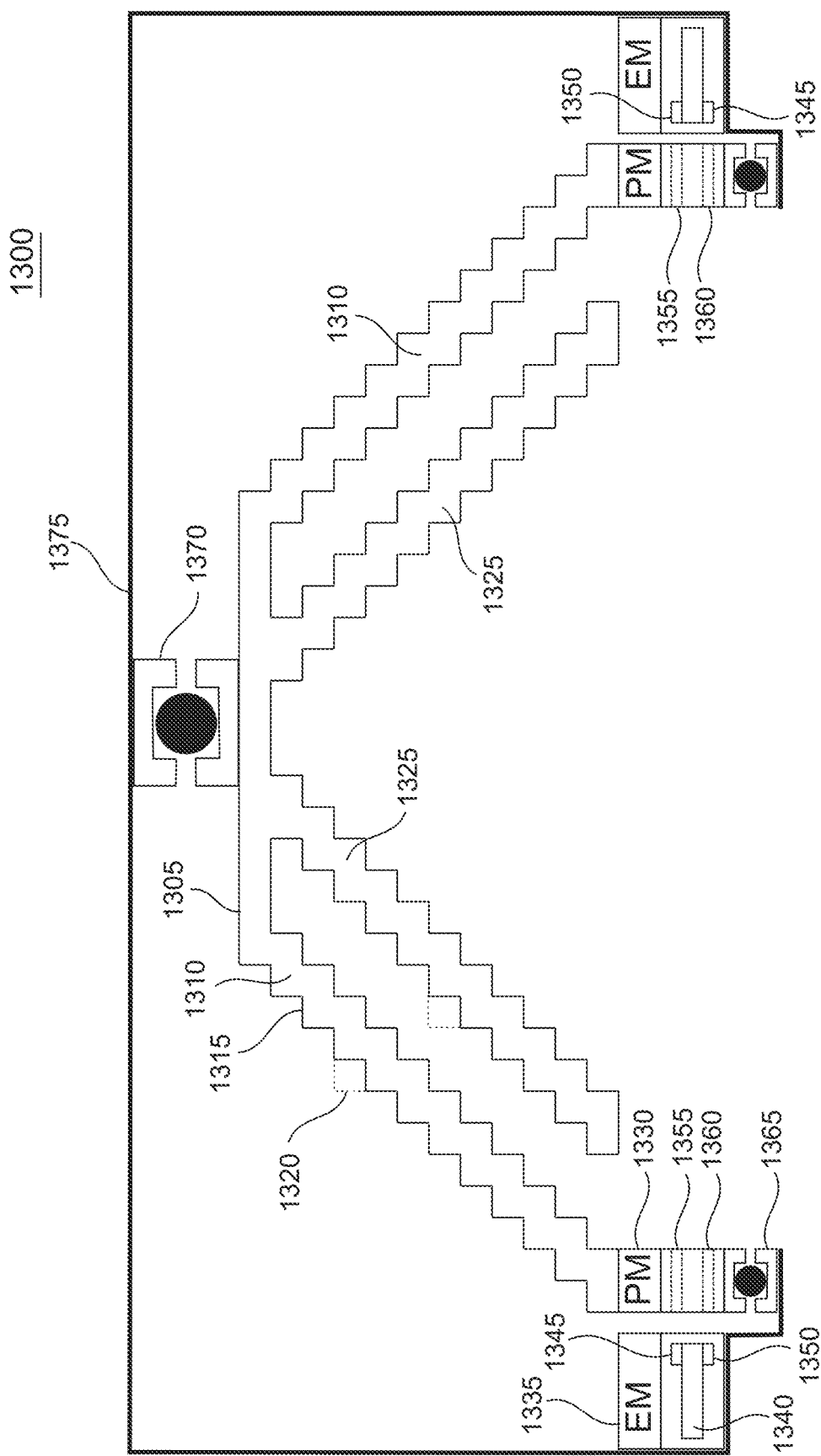
FIG. 13 illustrates a cross sectional side view of an alternative rotating lifting device.

FIG. 13 illustrates a cross sectional side view of alternative rotating lifting device 1300. Instead of using a stack of thin round plates 305 illustrated in FIG. 3, the same plate edge profile is implemented using a hollow 3D printed structure 1305. Overall, outer structure 1305 resembles an upside down circular bowl 1310 with stepped outer surface 1315. The inner surface can either be stepped like the outer surface or smooth. However, as 3D printing lays down discrete layers, it is most practical to use the same stepped surface as outer surface 1315.

As device 1300 rotates, each tooth 335 from FIG. 3 becomes visible as tooth height 1320. That is, the outer side profile of device 1300 is identical to an outer side profile (not illustrated) of lifting device 300 in FIG. 3.

Since 3D printed structure 1305 is hollow, another smaller upside down circular bowl 1325 with stepped outer surface can be formed inside outer structure 1310 to increase lift if desired.

To rotate structure 1305, a number of permanent magnet (PM) cavities 1330 are 3D printed around the bottom surface of circular bowl 1310, in which small permanent magnets are inserted. Multiple electromagnets (EM) 1335 are attached to circular stationary frame 1375, along with printed wiring boards (PWBs) 1340 which drive electromagnets 1335.

Whereas a Brushless DC (BLDC) motor would most likely be used to rotate lifting device 300 illustrated in FIG. 3, a distributed motor is illustrated in FIG. 13. BLDC motors typically use Hall Effect devices to sense timing rotation so as to control timing of electromagnet driving current. In this invention, to eliminate the need for Hall Effect devices, PWB 1340 implements transmit Light Emitting Diode (LED) 1345 and light sensing device 1350. Small circular holes 1355 and 1360 are 3D printed into circular bowl 1310.

As circular bowl 1310 rotates, LED 1345 on the left side of circular bowl 1310 shines through holes 1355 on both sides of circular bowl 1310 and is detected by light sensing device 1350 on the right side of circular bowl 1310. Likewise, LED 1345 on the right side of circular bowl 1310 shines through holes 1360 on both sides of circular bowl 1310 and is detected by light sensing device 1350 on the left side of circular bowl 1310. In this way, PWBs 1340 know the precise position of permanent magnets 1330 so as to know the timing and polarity required to drive electromagnets 1335.

The bottom surface of circular bowl 1310 containing permanent magnet cavities 1330 and small circular holes 1355 and 1360, is actually a rotating annular disc which could be fabricated separately and attached to the bottom of circular bowl 1310. Electromagnets 1335 and printed wiring boards 1340 are actually a stationary annular disc and could also be fabricated separately and simply attached to frame 1375. In this way, circular bowl 1310 can be 3D printed independently of the number of permanent magnets, electromagnets, and printed wiring boards needed to produce the required torque for various lift applications.

Rotating structure 1305 is attached to stationary structure 1375 using top bearing 1370, rotating annular disc is attached to bottom of rotating structure 1305, and multiple bottom bearings 1365 are attached between rotating annular disc and stationary structure 1375.

The primary benefit of this distributed motor is that any electromagnet and PWB heat is spread out and distributed over a large circular annular disc. Lower rotation speed and torque can be varied by either reducing current to electromagnets 1335 or by simply not driving all electromagnets 1335. Current drivers for electromagnets 1335 can be implemented using digital techniques and digital current switches which reduces power and heat.

Note that rotating lifting devices 300 and 1305 illustrated in FIG. 3 and FIG. 13 respectively are totally unlike previous U.S. Pat. Nos. 4,202,518 and 5,829,714. The motivation for both these previous patents was to eliminate a helicopter's rotary wing by using a rotating disc. Both patents point out that lift is produced by air pressure reduction on their rotating disc surface as predicted by Bernoulli's Theorem. In contrast, lift is not produced by the Bernoulli principal in devices 300 and 1305.

Although most current CMUTs are optimized for use in a linear pulse-echo mode for ultrasonic imaging, they can also be used in what is called the collapse snap-back mode where most of the central part of top membrane 420 collapses onto bottom electrode 415. This mode enables the CMUT to output more pressure. It has been found that output pressure in collapse mode is about 2 to 3.5 times higher than linear mode.

The literature also describes CMUT designs that use substrate-embedded springs supporting a rigid moving top plate, which provides improved output pressure at lower voltage. A CMUT cell with substrate-embedded springs is called a post-CMUT or PCMUT and resembles an ideal electrostatic piston with parallel movement.

Figure 14:
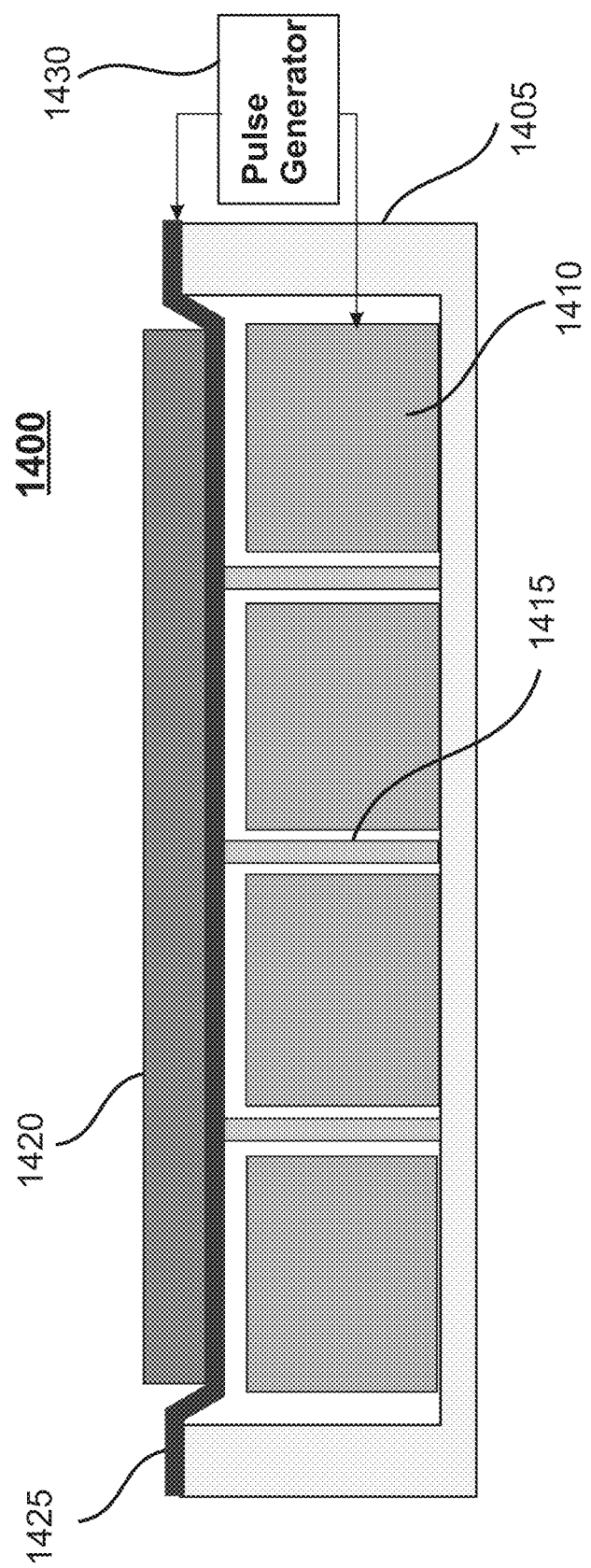
FIG. 14 illustrates a CMUT cell with substrate-embedded springs called a post-CMUT or PCMUT cell.

A typical PCMUT cell 1400 is illustrated in FIG. 14 and is composed of rigid top plate 1420 connected to mechanical support 1405 using thin border 1425 around rigid top plate 1420. Long and narrow posts 1415 provides the spring constant of the structure rather than the top plate as in a conventional CMUT. The average plate displacement (movement of silicon membrane 420 in FIG. 4) of the average CMUT is typically one-third of its maximum displacement at the center. In contrast, the average plate displacement of an ideal piston transducer is equivalent to its maximum plate displacement. That is, the entire rigid top plate 1420 moves as a single structure, without bending with movement as does CMUT silicon membrane 420.

Pulse generator 1430 is connected between rigid top plate 1420 (via thin border 1425) and substrate bottom electrode 1410. When no pulse is applied, posts 1415 push rigid top plate 1420 upward to its static position where bottom surface of thin border 1425 is even with top of mechanical support 1405. When pulse generator 1430 applies an output voltage, rigid top plate 1420 is pulled downward by voltage electrostatic force to position illustrated in FIG. 14. When pulse generator 1430 output voltage is removed, posts 1415 push rigid top plate 1420 upward to its static position.

Currently, MEMS, CMUT, and PCMUTs technology has been directed and optimized primarily for medical, non-destructive-testing, and imaging applications. As such, the design goal has been to obtain highly linear ultrasound transmit and receive signal spectral purity, so as to eliminate imaging artifacts.

For this artificial buoyancy application, linearization, spectral purity, and ultrasonic reception are not a requirement. Use as an ultrasonic emitter, which requires acoustic impedance matching between the emitter and medium being imaged or probed, is also not a requirement. Instead, the goal is to simply obtain a fast large membrane or piston downward displacement so as to reduce downward air pressure on the top surface of the lifting device. This simple requirement eliminates many of the precision and fabrication difficulties of ultrasonic MEMS devices.

For this artificial buoyancy application, voltage generator 405 in FIG. 4 (and pulse generator 1430 in FIG. 14) only needs to produce a single high voltage pulse to rapidly pull silicon membrane 420 down against bottom electrode 415. Pulse width is selected to hold silicon membrane 420 against bottom electrode 415 until air pressure on top surface of silicon membrane 420 returns to ambient pressure. At that time, voltage generator 405 output would return to zero volts. When silicon membrane 420 returns to its normal static position, voltage generator 405 would produce another single high voltage pulse and the cycle would repeat.

One of the benefits of CMUT technology is the compatibility of micromachining processes with CMOS processes, which enables the monolithic integration of CMUT arrays with electronics. For example, CMOS switch 1500 illustrated in FIG. 15 could also be mounted on CMUT module 700 illustrated in FIG. 7, and all CMUT cells 400 could be driven by one or more CMOS switches 1500.

In operation, a narrow low voltage (LV) control pulse at input 1505 would generate a similar high voltage (HV) pulse at output 1515. Input 1505 LV control pulse and input 1510 constant HV would be generated external to CMUT module 700.

CMUT module 700 lift will only occur during output 1515 high voltage pulse. This time will be shorter than the time required for silicon membrane 420 to return to its normal static position. To maintain a statistically constant vehicle lift force, control pulses at different CMOS switch 1500 inputs 1505 can be staggered in time. This will prevent all CMUT modules 700 producing lift at the same instant, followed by short periods where no lift is produced.

Implementing lift in this artificial buoyancy application by obtaining a fast downward top surface displacement, so as to reduce downward air pressure on a top surface of lifting device without reducing upward air pressure on bottom surface, is not restricted to small scale MEMS, CMUT, and PCMUTs technology. The same technique can also be implemented using larger scale devices as illustrated in FIG. 16.

Figure 15:
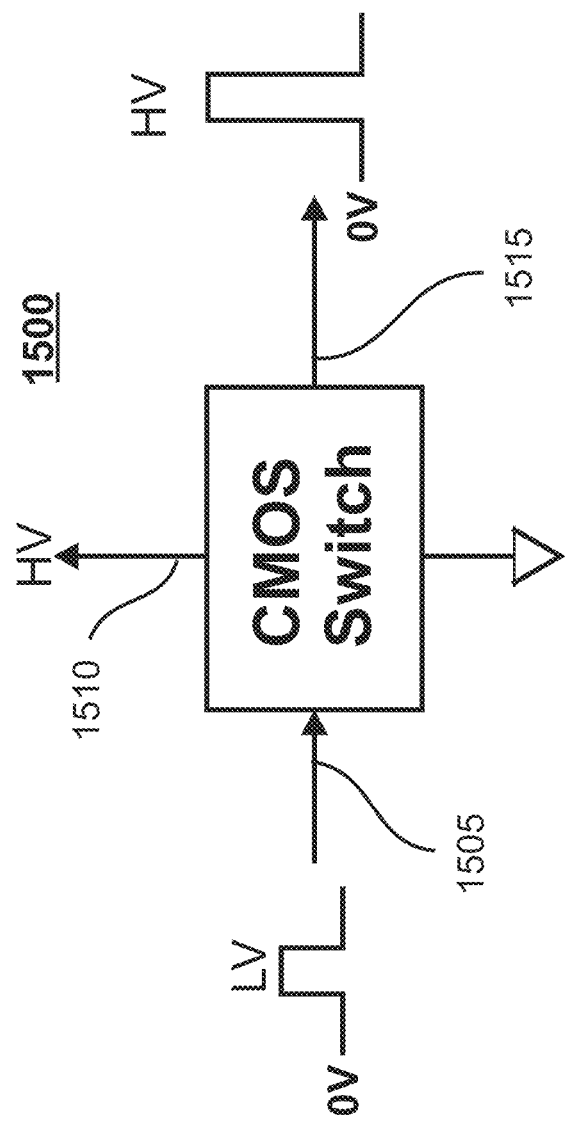
FIG. 15 illustrates a CMOS switch for CMUT cells.
Figure 16:
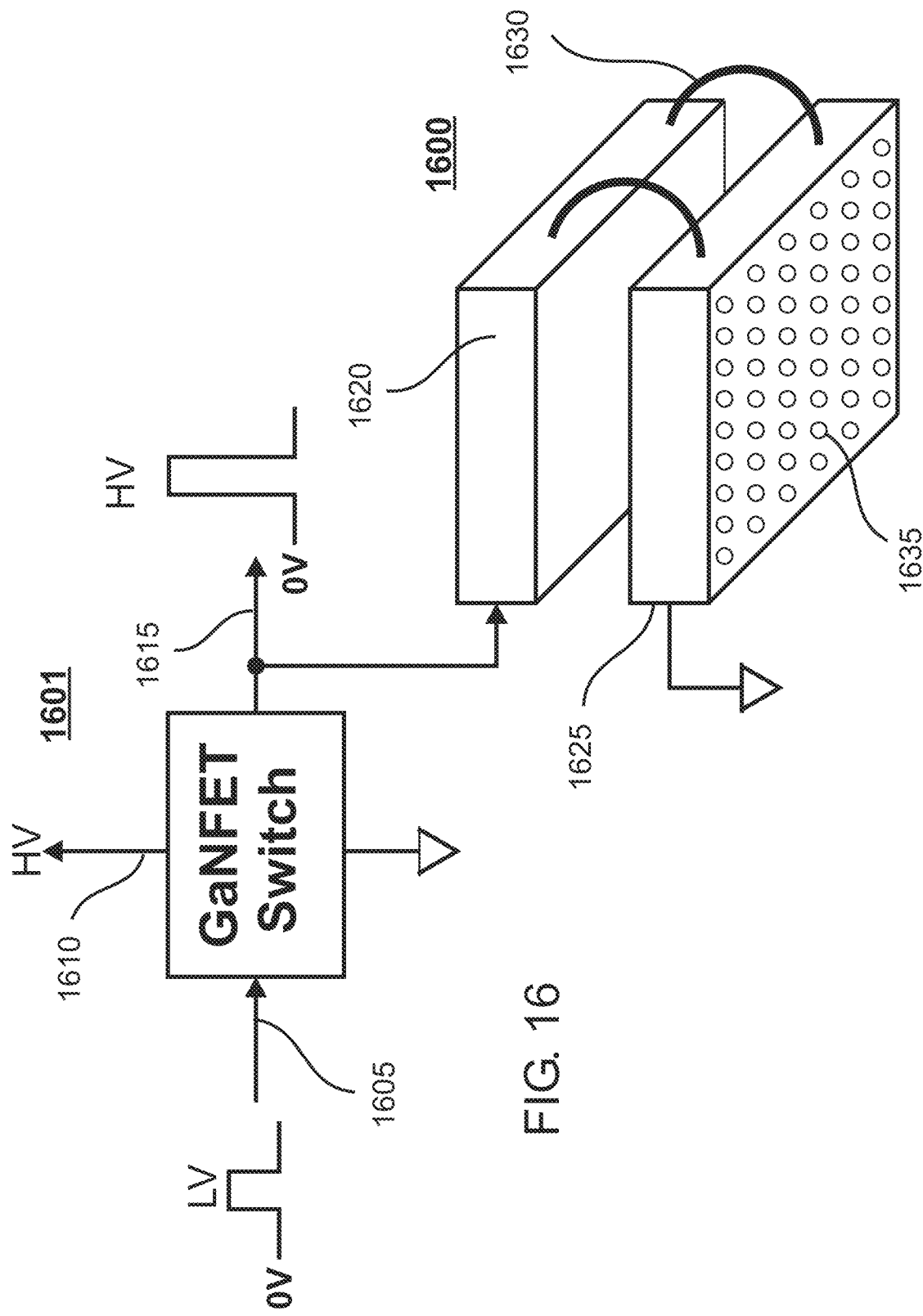
FIG. 16 illustrates a Capacitive Vented Ultrasonic Transducer (CVUT) cell using a high speed Gallium Nitride Field Effect Transistor (GaNFET) drive switch.

FIG. 16 implements the same ideal electrostatic piston with parallel movement technique as illustrated in FIG. 14 and FIG. 15. That is, rigid top plate 1620 of Capacitive Vented Ultrasonic Transducer (CVUT) cell 1600 is attached to bottom electrode plate 1625 using a series of springs 1630. Springs 1630 might consist of short lengths of springy stainless steel wire connecting all sides of rigid top plate 1620 and bottom electrode plate 1625 together. However, many other techniques could also be used.

Both top plate 1620 and bottom electrode plate 1625 have conductive surfaces that are high voltage insulated. Convenient material is standard epoxy copper-clad printed wiring boards in which their touching surfaces are insulated using Teflon or other coating. As in FIG. 15, bottom electrode plate 1625 of CVUT cell 1600 is connected to GaNFET switch 1601 ground while rigid top plate 1620 is connected to GaNFET switch 1601 output 1615. Again as in FIG. 15, a narrow low voltage (LV) control pulse at input 1605 will generate a similar high voltage (HV) pulse at output 1615.

Whereas vacuum air gaps are implemented in FIG. 4 CMUT and FIG. 14 PCMUT, the air gap in FIG. 16 is vented. To eliminate air back pressure on rigid top plate 1620 during movement when HV pulse output 1615 is applied, bottom electrode plate 1625 contains multiple small holes 1635.

As for PCMUT cell 1400 in FIG. 14, only a single high voltage pulse is required to rapidly pull rigid top plate 1620 down against bottom electrode plate 1625. Pulse width is again selected to hold rigid top plate 1620 against bottom electrode plate 1625 until air pressure on rigid top plate 1620 increases to ambient pressure.

CMUT or PCMUT cells have the advantage of only requiring low electrostatic voltages due to their small air gaps. They can also be constructed using highly automated semiconductor fabrication processes. Their disadvantage is that both the area and displacement of their movable membranes are very small. CVUT cells have both a larger movable membrane area and displacement. However, they require higher electrostatic voltages due to their larger air gap.

In recent years, power electronics technology has emerged where some techniques can deliver pulses greater than 100 kV in less than 100 ps. Lower cost GaN pulsers are capable of generating pulses up to 650 volts and 60 amps in less than a nanosecond. So these fast pulsers now make larger gap CVUT cells possible. Although it may be possible to implement a large vacuum air gap in CVUT cells instead of a vented air gap, sealing against air leaks could be difficult.

Figure 17:
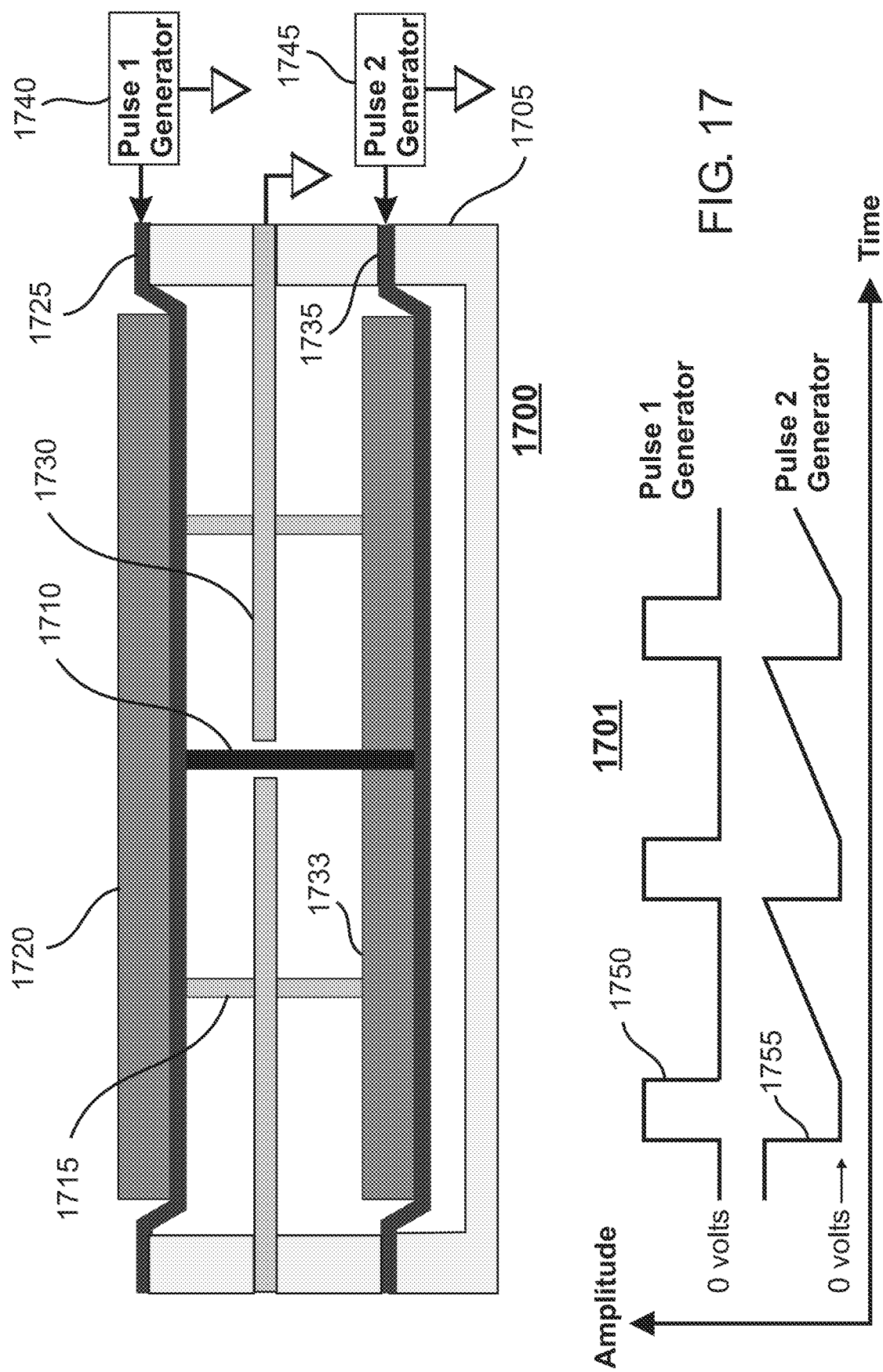
FIG. 17 illustrates a Double PCMUT cell with substrate-embedded springs called a DPCMUT cell.

For this artificial buoyancy application, the objective is to move a membrane with a large area and displacement downward rapidly so as to create maximum lift. However, a large membrane requires a strong restoring spring function prior to downward movement, so as to prevent ambient air pressure from pushing the membrane down into the air gap and thus reducing displacement. FIG. 17 illustrates a Double PCMUT cell with substrate-embedded springs 1700 called a DPCMUT cell to overcome this problem. Pulse generator drive voltages 1701 versus time are illustrated in FIG. 17.

FIG. 17 is similar to FIG. 14 except that two movable surfaces are implemented and connected together using a rigid member 1710. Pulse 1 generator 1740 output 1750 is connected to thin border 1725 around rigid top plate 1720. Pulse 2 generator 1745 output 1755 is connected to thin border 1735 around rigid top plate 1733. Both pulse generators are grounded to substrate 1730. Mechanical support is provided by structure 1705.

Pulse 1 generator 1740 output 1750 moves both upper rigid top plate 1720 and lower rigid top plate 1733 downward. Pulse 2 generator 1745 output 1755 moves both upper rigid top plate 1720 and lower rigid top plate 1733 upward.

This implementation reduces (or eliminates) the requirement for a strong restoring spring function prior to downward movement. Initially, pulse 2 generator 1745 drive voltage 1755 pushes both movable surfaces upward to their static position. To rapidly move rigid top plate 1720 downward away from lifting device top surface air pressure, pulse 2 generator 1745 output 1755 returns to zero simultaneously as pulse 1 generator output 1750 energizes. These outputs are maintained until ambient air pressure returns to rigid top plate 1720, at which time pulse 1 generator output 1750 returns to zero and pulse 2 generator 1745 output 1755 ramps back up.

As for PCMUT cell 1400 in FIG. 14, width of pulse 1 generator 1740 and pulse 2 generator 1745 are again selected to hold rigid top plate 1720 down until air pressure on rigid top plate 1720 returns to ambient pressure. At that time, both rigid top plates smoothly return to their static upward positions.

Figure 18:
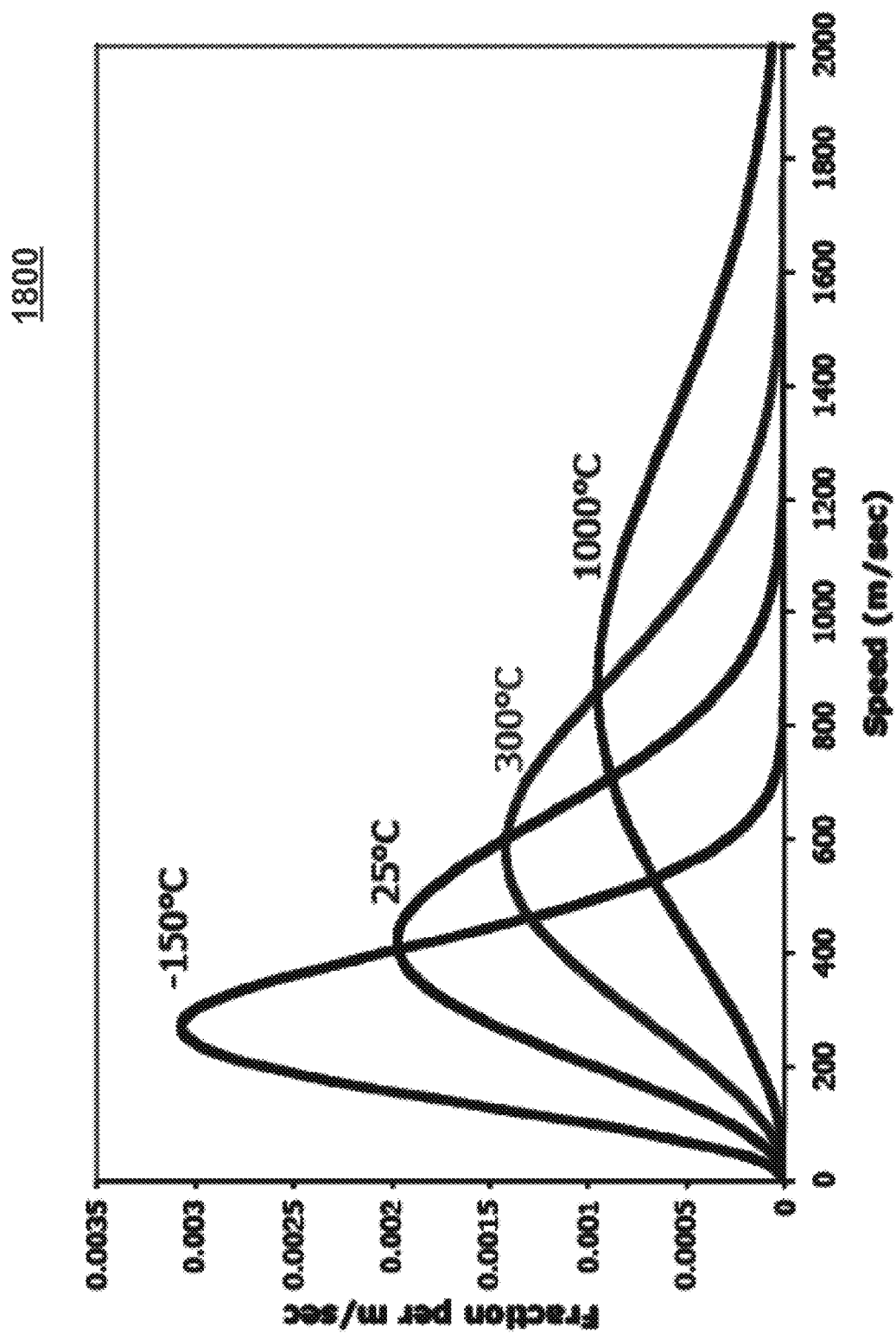
FIG. 18 illustrates the molecular speed distribution of a gas (nitrogen) at different temperatures.

To increase lift period, air temperature inside outer box 910 in FIG. 9 can be cooled which lowers molecular speed distribution of a gas, as illustrated by graph 1800 in FIG. 18 for nitrogen. This allows high voltage pulse period, and thus lift period, to be increased.

Figure 19:
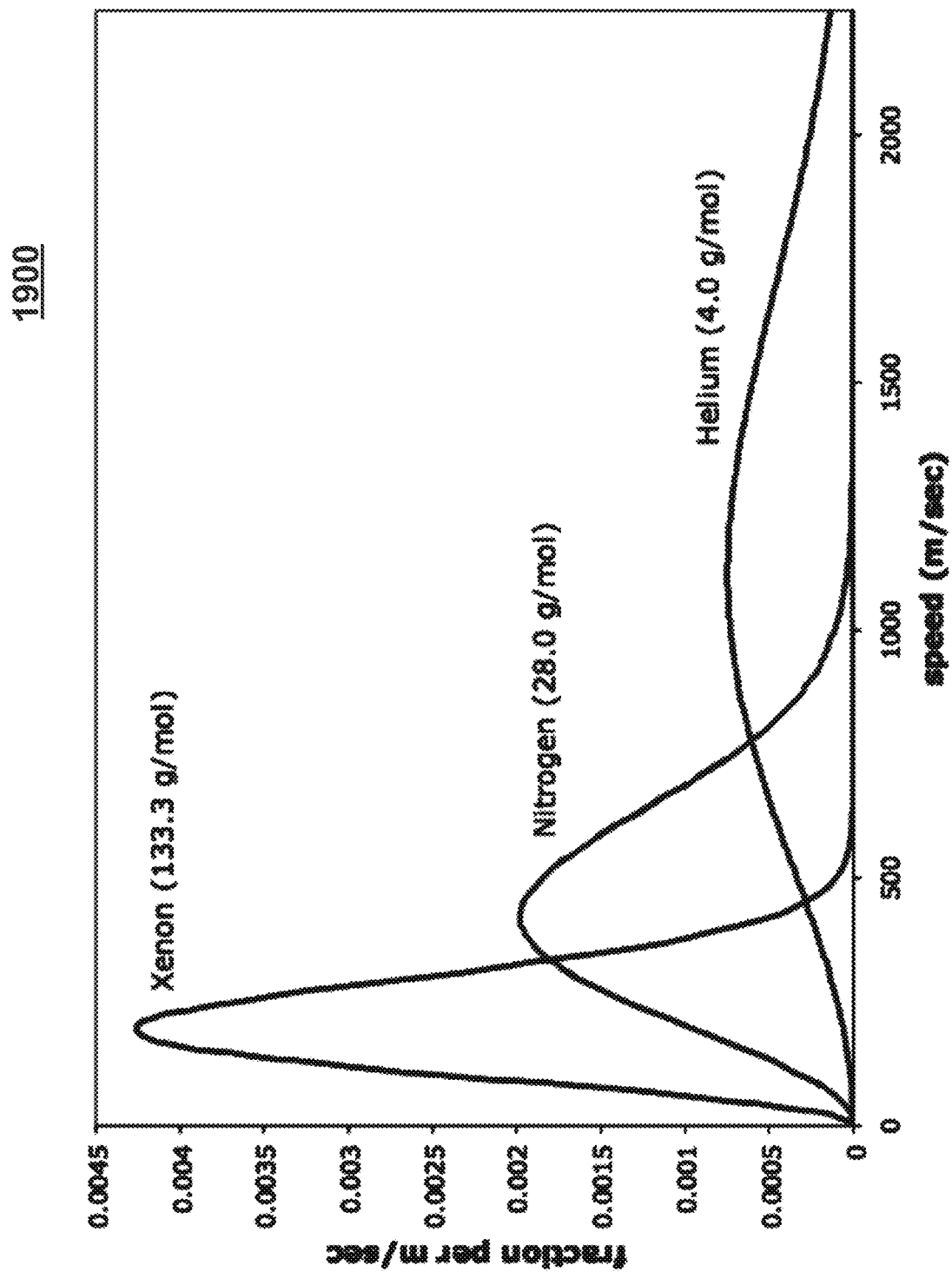
FIG. 19 illustrates the molecular speed distribution of various gases.

Molecular speed distribution of a gas can be further decreased by using a gas with a higher molar mass than standard atmosphere air as illustrated by graph 1900 in FIG. 19.

The Maxwell-Boltzmann molecular speed distribution of a gas is given by V=square root(2*RT/M) where V is the most probable speed, R is the gas constant (8.314 J/mol-K), and M is the molar mass of the gas (kg/mol).

By filling outer box 910 in FIG. 9 with cooled Xenon, a substantial increase in lift period can be obtained. Also, note that molecular speed distribution is only a function of temperature and molar mass. Therefore, pressure of cooled Xenon can be increased, which will further increase lift. That is, while a low downward pressure exists on the movable membrane during high voltage pulse period, an even higher upward lift pressure continuously exists on the bottom of the movable membrane by using cooled Xenon gas instead of air.

Xenon is a noble gas like Nitrogen and Helium. Therefore, there should be no hazard using it for this lift application.

MEMS, CMUT, and PCMUTs are very mature technology, having been around for more than 20 years. Numerous information is readily available on their theory, properties, fabrication, and performance. However, these devices have never been studied, used, or suggested for an artificial buoyancy lift application as described in this invention patent disclosure.

Although the preferred embodiments of the invention have been illustrated and described in detail, it will be readily apparent to those skilled in the art that various modifications may be made therein without departing from the spirit of the invention.

This patent application discloses two basic techniques for obtaining efficient artificial buoyancy aeronautical lift, which is achieved by lowering downward air pressure on a top surface of a lifting device without changing upward air pressure on a bottom surface.

The first basic technique is achieved by pushing air sideways off a top surface of a lifting device, to lower downward air pressure on a top surface without changing upward air pressure on a bottom surface.

The second basic technique is achieved by rapidly moving a top surface of a lifting device downward away from downward air pressure, to lower downward air pressure on a top surface without changing upward air pressure on a bottom surface.

Pyramid shaped lifting device 200 in FIG. 2, rotating lifting device 300 in FIG. 3, and alternative rotating lifting device 1300 in FIG. 13, all illustrate the first basic technique of obtaining efficient aeronautical lift.

CMUT technology illustrated in FIG. 4, PCMUT technology illustrated in FIG. 14, and DPCMUT technology illustrated in FIG. 17 all illustrate the second basic technique of obtaining efficient aeronautical lift.

Figure 7:
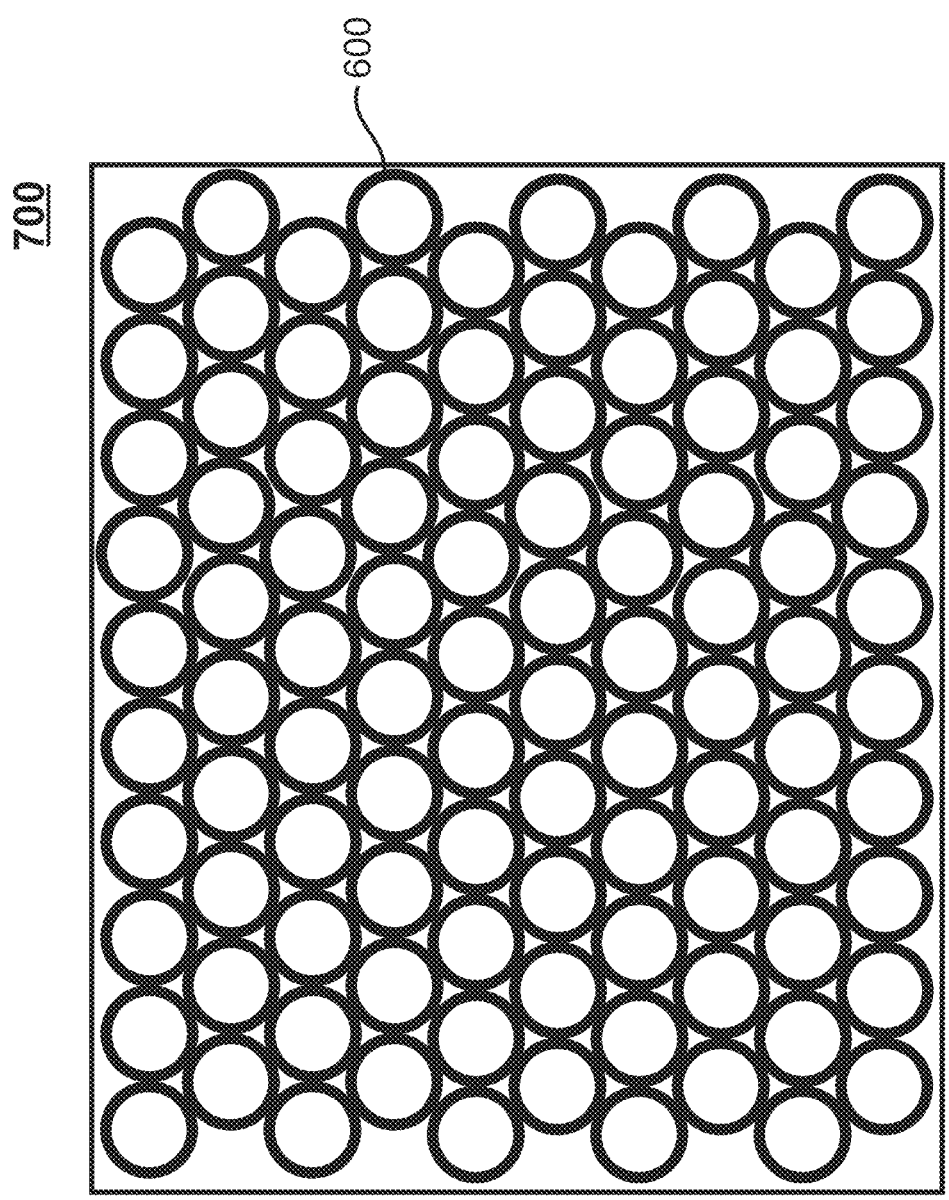
FIG. 7 illustrates a CMUT module consisting of 100 modified CMUT cells.

The advantage of CMUT, PCMUT, and DPCMUT technology is that once a single MEMS technology cell is optimized for this lifting application, multiple identical cells can be fabricated into modules such as illustrated in FIG. 7. Numerous modules can then be assembled into structures such as illustrated in FIG. 8 to obtain any lift required. Filling each thin flat enclosure 805 with xenon gas that is maintained at a constant temperature and pressure, allows the MEMS cell to be optimized for maximum lift at a temperature and pressure that doesn't vary.

What is claimed is:

1. A method of creating an aeronautical lift by reducing downward air pressure on a top surface of a lifting device below upward air pressure on a bottom surface of said lifting device, said method comprising:

moving a portion of said top surface of said lifting de-vice downward without changing upward air pressure on said bottom surface of said lifting device;

pointing said top surface of said lifting device in direction of desired said aeronautical lift;

mounting a plurality of Capacitive Micromachined Ultrasonic sonic Transducer (CMUT) cells on said top surface of said lifting device;

applying a voltage pulse to said plurality of CMUT cells, wherein amplitude of said voltage pulse is sufficient to pull said movable surface of said plurality of CMUT cells into air gap of said plurality of CMUT cells;

removing said voltage pulse from said plurality of CMUT cells;

repeatedly said applying and said removing said voltage pulse at a rate sufficient to create desired said aeronautical lift;

fabricating one or more said plurality of CMUT cells into a module, wherein said plurality of CMUT cells of said module are connected together and driven using said voltage pulse;

placing one or more said modules in an enclosure; and attaching one or more of said enclosures to said lifting device.

2. The method as in claim 1 wherein said plurality of CMUT cells are Post Capacitive Micromachined Ultrasonic Transducer (PCMUT) cells are fabricated with substrate-embedded springs which resembles an ideal electrostatic piston with parallel movement.

3. The method as in claim 1 wherein:

said plurality of CMUT cells are a Double Post Capacitive Micromachined Ultrasonic Transducer (DPCMUT) cells composed of an upper movable surface connected to a lower movable surface.

4. The method as in claim 3 further comprising:

applying a first voltage pulse to said upper movable surface of said Double Post Capacitive Micromachined Ultrasonic Transducer (DPCMUT) cell and simultaneously terminating a second voltage pulse to said lower movable surface of said DPCMUT cell, wherein amplitude of said first voltage pulse is sufficient to pull said upper movable surface and said lower movable surface into air gaps of said DPCMUT cell;

terminating said first voltage pulse to said upper movable surface of said DPCMUT cell and simultaneously applying said second voltage pulse to said DPCMUT cell, wherein amplitude of said second voltage pulse is sufficient to return said upper movable surface and said lower movable surface of said DPCMUT cell to their initial static positions; and repeatedly said applying and said terminating said first voltage pulse and said second voltage pulse at a rate sufficient to create desired said aeronautical lift.

5. The method as in claim 1 further comprising:

placing artificial buoyancy said lifting device in a sealed enclosure;

filling said sealed enclosure with a gas; and maintaining said gas in said sealed enclosure at a constant specified pressure.

6. The method as in claim 5 additionally comprising maintaining said gas in said sealed enclosure at a constant specified temperature.

7. The method as in claim 5 additionally comprising selecting said gas in said sealed enclosure whose molar mass is higher than molar mass of standard atmosphere air.

\* \* \* \* \*